US010735582B2

(12) United States Patent
Delinsky et al.

(10) Patent No.: US 10,735,582 B2
(45) Date of Patent: *Aug. 4, 2020

(54) APPARATUS PROCESSING PHONE CALLS

(71) Applicant: Peter K Trzyna, Chicago, IL (US)

(72) Inventors: William John Delinsky, Marriottsville, MD (US); Timothy James Fish, Marriottsville, MD (US); Michael D. Morency, Marriottsville, MD (US); David Gary Walker, Reisterstown, MD (US)

(73) Assignee: Peter K. Tazyna, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,088

(22) Filed: Mar. 11, 2019

(65) Prior Publication Data
US 2019/0208054 A1    Jul. 4, 2019

Related U.S. Application Data

(63) Continuation of application No. 14/275,094, filed on May 12, 2014, now Pat. No. 10,230,840, which is a
(Continued)

(51) Int. Cl.
*G06Q 40/00* (2012.01)
*H04M 3/42* (2006.01)
(Continued)

(52) U.S. Cl.
CPC ........ *H04M 3/42059* (2013.01); *G06Q 40/00* (2013.01); *G06Q 40/02* (2013.01);
(Continued)

(58) Field of Classification Search
CPC .............................. G06Q 40/00; G06Q 40/025
See application file for complete search history.

(56) References Cited

U.S. PATENT DOCUMENTS 5,586,257 A * 12/1996 Perlman .................. A63F 13/12
463/42
5,825,869 A * 10/1998 Brooks .................... H04M 3/51
379/265.12

(Continued)

*Primary Examiner* — Lalita M Hamilton
(74) *Attorney, Agent, or Firm* — Peter K Trzyna

(57) ABSTRACT

A system for referring a telephone communication to one of a plurality of financial assistance providers based on lender criteria, the method including the steps of: storing telephone numbers for a plurality of financial assistance providers in memory accessible by a digital electrical computer; obtaining lender criteria for selecting one of the financial assistance providers; storing said criteria for access by said computer; identifying a debtor; selecting one of the financial assistance providers by accessing the criteria, applying the criteria, and accessing one of the stored telephone numbers; and connecting the debtor by telephone to the one of the stored telephone numbers. The system can be used with an intermediary that detects referring information sufficient to identify a referrer identity, to select which one of several financial assistance providers to refer the inbound communication by using a computer to look up and to apply referral criteria responsive to the referrer identity, and to form and track the call referral.

20 Claims, 13 Drawing Sheets

Related U.S. Application Data continuation of application No. 13/532,479, filed on Jun. 25, 2012, now Pat. No. 8,725,630, which is a continuation of application No. 12/917,401, filed on Nov. 1, 2010, now Pat. No. 8,209,257, which is a continuation of application No. 09/692,697, filed on Oct. 19, 2000, now Pat. No. 7,827,097.

(51) Int. Cl.
    *G06Q 40/02*     (2012.01)
    *G06Q 40/08*     (2012.01)
    *H04M 3/493*     (2006.01)

(52) U.S. Cl.
    CPC .......... *G06Q 40/025* (2013.01); *G06Q 40/08* (2013.01); *H04M 3/493* (2013.01)

(56) References Cited

U.S. PATENT DOCUMENTS

| | | | | |
|---|---|---|---|---|
| 5,884,032 | A | * | 3/1999 | Bateman ................. H04L 29/06 709/204 |
| 6,724,887 | B1 | * | 4/2004 | Eilbacher ............ H04M 3/5183 379/265.02 |
| 2002/0007341 | A1 | * | 1/2002 | Lent ..................... G06Q 40/025 705/38 |
| 2002/0055906 | A1 | * | 5/2002 | Katz ....................... G06Q 30/02 705/39 |
| 2002/0123949 | A1 | * | 9/2002 | VanLeeuwen ......... G06Q 40/00 705/35 |
| 2003/0028477 | A1 | * | 2/2003 | Stevenson ........... G06Q 40/025 705/38 |
| 2003/0055778 | A1 | * | 3/2003 | Erlanger ................ G06Q 40/02 705/38 |

\* cited by examiner

FIG. 6

PEREGRIN
SERVICES CORP.

Members
>Member Login

*Please Enter Your User Name and Password Below*

User Name [ ]
Password [ ]

[Submit] [Reset]

Don't have a User name and Password?
You can enroll with Peregrin as a receiver or referrer for free.
Click here to enroll

Forget your User Name or Password?
Click here for an email reminder

Members
Member Login
Member Summary
Daily Reports
7 Day Reports
30 Day Reports
Year Reports
Custom Reports
Peregrin Summary Reports Links and News
What we do
About Peregrin Contact Us Home   Privacy Policy

LEVEL ONE-
DATE RANGE

FIG. 8

RECEIVER SUMMARY FOR YEAR TO DATE
JANUARY 1, 2000 THROUGH AUGUST 21, 2000

| RECEIVER | LOCATION | TYPE | TOTAL CALLS | PRIM | SEC | TOTAL NOT COMP. | BUSY | NA | AVG. CALL LENGTH |
|---|---|---|---|---|---|---|---|---|---|
| ▷ Compare ▷ Drill Down — Receiver Agency "A" | Yourtown | Both | 6 | 0 (0%) | 2 (33%) | 4 (67%) | 2 (50%) | 2 (50%) | 1.54 minutes |
| Move our mouse over these buttons for a description (See Section 4 above for details on these buttons) | Each referrer sending referrals is listed Click on it to visit their website. | Referring Center and Department | Total Calls referred to your agency. | Sent to you as first choice. | Sent to you as default. | Total Calls sent but not completed. | Reasons for not being completed. | | Average Length of all completed calls. |
| | | | Percentages are shown for each category. | | | | | | |

LEVEL TWO-

RECEIVER AGENCY "A", YOURTOWN
YTD SUMMARY BY MONTH

| DATE | TOTAL CALLS | PRIM | SEC | TOTAL NOT COMP. | BUSY | NA | AVG. CALL LENGTH |
|---|---|---|---|---|---|---|---|
| August | 6 | 0 (0%) | 2 (33%) | 4 (67%) | 2 (50%) | 2 (50%) | 1.54 minutes |

LEVEL THREE-

RECEIVER AGENCY "A", YOURTOWN
DAILY SUMMARY FOR MONTH OF AUGUST

| DATE | TOTAL CALLS | PRIM | SEC | TOTAL NOT COMP. | BUSY | NA | AVG. CALL LENGTH |
|---|---|---|---|---|---|---|---|
| August 21, 2000 | 6 | 0 (0%) | 2 (33%) | 4 (67%) | 2 (50%) | 2 (50%) | 1.54 minutes |

FIG. 9

LEVEL FOUR -

RECEIVER AGENCY "A", YOUR TOWN
CREDIT CARD SUMMARY
FOR AUGUST 21, 2000

| CREDIT CARD # | PHONE # OF ORIGINATION | STATE OF ORIGINATION | DATE OF CALL | TIME OF CALL | LENGTH OF CALL |
|---|---|---|---|---|---|
| 7777-8888-4444-9999 | 7034217800 | VA | 08/21/00 | 18:18 | N/A |
| 5555-5555-5555-5555 | 7034217800 | VA | 08/21/00 | 12:39 | N/A |
| 4444-5555-4444-5555 | 7034217800 | VA | 08/21/00 | 12:32 | N/A |
| 8888-4444-9999-7777 | 7034217800 | VA | 08/21/00 | 12:23 | 3:08 MINUTES |
| 0 | 7034217800 | VA | 08/21/00 | 11:58 | N/A |

LEVEL FIVE -

| DATE OF CALL | PHONE # OF ORIGINATION | STATE OF ORIGINATION | TIME OF CALL | LENGTH OF CALL |
|---|---|---|---|---|
| 05/03/00 | 4109798209 | MD | 21:42 | .38 MINUTES |
| 05/03/00 | 4107816702 | MD | 21:38 | .58 MINUTES |
| 05/03/00 | 5014841631 | AR | 13:20 | 1.48 MINUTES |

COMPARISON SUMMARY FOR YEAR TO DATE
ON SAMPLE AGENCY A

| REFERRER NAME | % OF TOTAL CALLS | COMPLETION % | AVG. CALL LENGTH |
|---|---|---|---|
| DEMO REFERRER 1 | 96% | 88% | 3.82 MINUTES |
| REFERRER 1 | 4% | 100% | 1.37 MINUTES |

YOUR AGENCY IS LISTED FIRST, FOLLOWED BY OTHER RECEIVERS USED BY THIS REFERRER

YOU WILL SEE WHAT PERCENT OF THAT REFERRER'S REFERRALS WENT TO EACH RECEIVER THEY USE.

VIEW CALL COMPLETIONS BY RECEIVER

ALSO VIEW CALL LENGTHS BY RECEIVER

FIG. 10

Members
>Custom Reports

CCA NAME: [ ▼ ]

START DATE: DAY: [1 ▼] MONTH: [JULY ▼] YEAR: [2000 ▼]

END DATE: DAY: [31 ▼] MONTH: [JULY ▼] YEAR: [2000 ▼]

STATE ORIGIN: [ALL ▼]

AREA CODE OF ORIGIN: [ALL ▼]

CREDIT CARD NUMBER: [ ]

[ RUN REPORT ]

FIG. 11

DAY OF WEEK / TIME OF DAY ANALYSIS

| DAY OF WEEK | # OF CALLS | # OF COMPLETED CALLS | % OF CALLS COMPLETED | % OF MORNING CALLS | % OF AFTERNOON CALLS | % OF EVENING CALLS | AVG. CALL LENGTH |
|---|---|---|---|---|---|---|---|
| Sunday | 42 | 29 | 69% | 0% | 3% | 97% | .66 minutes |
| Monday | 101 | 37 | 37% | 59% | 22% | 19% | .86 minutes |
| Tuesday | 164 | 53 | 32% | 0% | 15% | 85% | .86 minutes |
| Wednesday | 100 | 21 | 21% | 5% | 19% | 76% | 2.01 minutes |
| Thursday | 48 | 24 | 50% | 0% | 21% | 79% | 1.01 minutes |
| Friday | 29 | 9 | 31% | 22% | 78% | 0% | .58 minutes |
| Saturday | 37 | 14 | 38% | 14% | 29% | 57% | 1.11 minutes |

TIME OF MONTH ANALYSIS

| MONTH | # OF CALLS | # OF COMPLETED CALLS | % OF CALLS COMPLETED | % EARLY MONTH | % MID MONTH | % LATE MONTH | AVG. CALL LENGTH |
|---|---|---|---|---|---|---|---|
| April | 350 | 93 | 27% | 0% | 70% | 30% | 1.08 minutes |
| May | 171 | 94 | 55% | 64% | 36% | 0% | .89 minutes |

STATE OF ORIGIN ANALYSIS

| STATE | # OF CALLS | # OF COMPLETED CALLS | % OF CALLS COMPLETED | AVG. CALL LENGTH |
|---|---|---|---|---|
| Alabama | 2 | 0 | 0% | 0 |
| Arizona | 1 | 0 | 0% | 0 |
| Arkansas | 1 | 1 | 100% | 1.48 minutes |
| California | 9 | 1 | 11% | 3.15 minutes |

INCOMPLETE CALL SUMMARY

| NUMBER OF COMPLETED CALLS | NUMBER OF INCOMPLETE CALLS | % OF CALLS COMPLETED | % OF INCOMPLETE CALLS | CUSTOMER ABORT | BUSY | NO ANSWER |
|---|---|---|---|---|---|---|
| 71 | 1 | 99% | 1% | 0 (0%) | 5 (500%) | 5 (500%) |

APPARATUS PROCESSING PHONE CALLS

I. PRIORITY STATEMENT

The present patent application is a continuation of, and incorporates by reference from as if fully restated herein, U.S. patent application Ser. No. 14/275,094, filed on May 12, 2014, pending. U.S. patent application Ser. No. 14/275,094 is a continuation of, and incorporates by reference from as if fully restated herein is a U.S. patent application Ser. No. 13/532,479, filed on Jun. 25, 2012, issuing as U.S. Pat. No. 8,725,630 on May 13, 2014. Ser. No. 13/532,479 is a continuation of, and incorporates by reference from as if fully restated herein, U.S. patent application Ser. No. 12/917,401 filed Nov. 1, 2010, issued as U.S. Pat. No. 8,209,257 on Jun. 26, 2012. Ser. No. 12/917,401, incorporated by reference from as if fully restated herein, is a continuation of U.S. patent application Ser. No. 09/692,697 filed Oct. 19, 2000, issued as U.S. Pat. No. 7,827,097 on Nov. 2, 2010.

A portion of the disclosure of this patent document contains material that is subject to copyright protection. The copyright owner has no objection to a statutory fair use of this material, as it appears in the files of the files or records of the U. S. Patent and Trademark Office, but otherwise reserves all copyright rights whatsoever.

II. TECHNICAL FIELD OF THE INVENTION

The present invention pertains to an electrical digital computer machine and a data processing system, methods of making and for using the machine, products produced thereby, as well as data structures and articles of manufacture pertaining thereto, and all necessary intermediates of that which is discussed herein, all in the field of computerized aspects of card crediting to mortgages and the like. More particularly, this invention relates to a digital electrical data processing system having particular utility in financial fields related hereto. Still more particularly, the present invention pertains to call referral, as in the case of a calling debtor who is referred by the lender to a credit counseling agency, along with automated generation of related documentation, inter-computer communications, and networking.

III. BACKGROUND OF THE INVENTION

Prior to the present invention, the technology of referring a debtor to a credit-counseling agency or other financial assistance provider could not be considered robust.

The generally excepted method for lenders (creditors) to refer consumers (debtors) to credit counseling agencies was to (a) tell them to their local yellow pages or (b) tell them to call one of two toll-free telephone numbers supported by the National Foundation for Credit Counseling (NFCC) or the Association of Independent Consumer Credit Counseling Agencies (AICCCA). The prior method of making referrals was a one-to-one approach that utilized only existing telephones. In some cases, individual or multiple credit counseling agencies would establish relationships with creditors who in turn would make referrals directly to that or those agencies. In some cases, credit counseling agencies would produce manual or computer reports outlining which of the creditors customer(s) called the agency or agencies. In most cases, these reports were compiled after a predefined period often 30 to 60 days later. Where a creditor has multiple relationships and receives multiple reports then the data from each report has to be merged into a single summary report by the creditor requiring additional time and expense.

There is no known incidence of automated referral of a debtor to an intermediary or a second such referral from the intermediary to the financial assistance center, such as a credit agency. Thus, there was no known capturing of a referrer or lender identity, or caller or debtor identity, by say the intermediary for use in, say, tracking, reporting, or feedback to any of the parties involved. Nor would there be any automated referral criteria for selecting a financial assistance center (e.g., credit counseling agency, other lender, etc.), say, by computer logic that applies referral criteria to the call. Lenders would have little idea how the credit counseling agencies fared, and the agencies would nave no idea how they fared as compared with other agencies.

In sum, the industry has worked long and hard to collect on debts, and there is a plethora of lenders, troubled debt, and financial assistance centers, yet the known prior art has shortcomings that have left many inadequately addressed needs.

A. Objects and Advantages

In view of the foregoing, an object of the invention for which a patent is sought is improve over or overcoming some or all of the drawbacks indicated herein.

It is an object of the present invention to provide a computer system linked to call referral activity from debtors to lenders, e.g., by way of an intermediary, to financial assistance centers.

It is another object of the present invention to provide a computer system to select which of a plurality of financial assistance centers is suitable, based on lender-specified criteria, for referral of particular calls.

It is yet another object of the present invention to provide a computer system to capture debtor, and preferably lender, identities and/or other data (e.g., by ANI, DINS, IVR, telephony,) for referral and feedback, reporting, management, and comparative purposes.

It is still another object of the present invention to provide a computer system to communicate call referral reports, in real or near real time, to a secure global network site, such as an Internet web site.

It is an additional object of the present invention to provide a computer system to trigger call routing by defaults, time of day, location of caller, quantity (e.g., percent of calls placed to a center, prior communication between a particular caller and center, etc.)

It is also an object of the present invention to provide a computer system to generate call referral reports by time of day, day of week, state of debtor, as well as an analysis of uncompleted (e.g., hang ups) calls, comparison with other centers—especially those used by a common lender.

These and other objects and advantages of this invention will become apparent from a consideration of the figures and ensuing description in contrast to the state of the art before the present invention.

B. Summary of the Invention

These and the other objects of the present invention, as apparent from the specification as a whole, are carried out by providing a machine, manufacture, process, and improvement thereof in which user defined criteria is electronically and digitally stored in a custom database which processes and modifies electrical and digital signals representing data so as to overcome the aforementioned disadvantages of prior referral management policies or systems. More particularly, the invention involves, a computerized system for the management, tracking, and reporting of referrals made from one company, individual, or entity to another company, individual, or entity. More particularly, the present invention relates to a process that utilizes telecommunications technology, computer technology, database technology, web-based reporting application technology to manage, track, and report results based on the user defined criteria.

More particularly, this invention relates to an automated computer system that allows referrers to define referral criteria, manage their referral process, track referrals and types, and number of referrals, and receive referral results in pre-defined or custom reports in real time or near-real time. One particular application for this invention is in the credit counseling industry where issuers of unsecured debt such as credit cards might be interested in referring financially stressed customers to credit counseling agencies for assistance in meeting their financial obligations.

Even more particularly, the present invention relates to an improved digital electrical computer-based system configured to address the foregoing objects, including a machine (programmed computer), methods for making and using it, products produced by the method, data structures, and necessary intermediates, collectively referenced herein after as the method (for the sake of brevity).

Accordingly, the invention can be exemplified as a computer-aided method such as that for a referrer-controlled method for transferring an inbound communication to one of a plurality of financial assistance providers, the method including the steps of: receiving an inbound communication from a referring apparatus of information sufficient to identify a referrer identity; selecting which one of a plurality of financial assistance providers to refer the inbound communication by using a computer to look up and to apply referral criteria responsive to the referrer identity; and connecting the inbound communication to the one of the plurality of the financial assistance providers in accordance with the criteria.

In any of the embodiments, the steps of receiving and selecting can be carried out with the referrer identity being a lender identity and with said inbound communication including a telephone connection to a debtor of a lender having the lender identity.

Another way of viewing the invention is that it is a method for referring a telephone communication to one of a plurality of financial assistance providers based on lender criteria, the method including the steps of: storing telephone numbers for a plurality of financial assistance providers in memory accessible by a digital electrical computer; obtaining lender criteria for selecting one of the financial assistance providers; storing said criteria for access by said computer; identifying a debtor; selecting one of the financial assistance providers by accessing the criteria, applying the criteria, and accessing one of the stored telephone numbers; and connecting the debtor by telephone to the one of the stored telephone numbers.

In any of the embodiments, the invention can be carried out by further including the steps of: using ANI to detect a telephone number; and associating the telephone number with debtor information.

In any of the embodiments, the invention can be carried out by further including the steps of: using DNIS to detect a telephone number; and associating the telephone number with lender information.

In any of the embodiments, the invention can be carried out by further including the steps of: receiving debtor-identifying information by telephony; and communicating the information from said telephony to the lender for tracking debtor payment performance.

In any of the embodiments, the step of connecting can be carried out with the financial assistance center being a credit-counseling agency.

In any of the embodiments, the invention can be carried out by further including the step of: providing some of said financial assistance centers with call activity reporting by means of a secure web site.

In any of the embodiments, the invention can be carried out by further including the step of: providing call activity reporting updated no less than daily at a secure web site.

In any of the embodiments, the invention can be carried out by further including the step of: providing a web site demonstration of said method.

In any of the embodiments, the step of selecting can include: applying as said criteria a call routing triggered by a quantity of prior calls respectively placed to the financial assistance centers.

In any of the embodiments, the step of selecting can include: applying as said criteria a call routing triggered by a detection of a debtor who has previously been referred to one of the financial assistance centers.

In any of the embodiments, the step of selecting can include: applying as said criteria a call routing triggered by time of day.

In any of the embodiments, the step of selecting can include: applying as said criteria a call routing triggered by location of the debtor.

In any of the embodiments, the step of selecting can include: applying as said criteria a call routing triggered by time of day, location of the debtor, and a quantity of prior calls respectively placed to the financial assistance centers.

In any of the embodiments, the step of selecting can include: applying as said criteria a default call routing triggered by a failure to make a first connection to one of the financial assistance centers.

In any of the embodiments, the invention can be carried out by further including the steps of: storing call referral information including number of calls and call duration data for each said financial assistance center; and generating a report of said call referral information.

In any of the embodiments, the invention can be carried out by further including the steps of: storing call referral information including caller hang up data; and generating a report of said call referral information.

In any of the embodiments, the invention can be carried out by further including the steps of: storing call referral information including attempted but uncompleted call connecting; and generating a report of said call referral information.

In any of the embodiments, the invention can be carried out by generating a call referral report by time period for each said financial assistance center.

In any of the embodiments, the invention can be carried out by further including the step of: including in the report an analysis of call referral activity by time of day.

In any of the embodiments, the invention can be carried out by including in the report an analysis of call referral activity by day of week.

In any of the embodiments, the invention can be carried out by including in the report an analysis of call referral activity by state of debtor.

In any of the embodiments, the invention can be carried out by including in the report an analysis of uncompleted calls.

In any of the embodiments, the invention can be carried out by generating a call referral report including a comparison of said financial assistance centers.

In any of the embodiments, the step of generating includes generating the call referral report including the comparison of said financial assistance centers by a respective one of the lenders.

In any of the embodiments, the invention can be carried out by using IVR to associate the telephone number with debtor information.

In any of the embodiments, the invention can be carried out as a report (product) produced by a method.

In any of the embodiments, the invention can be carried out as a computer system programmed to implement a method for referring a telephone communication to one of a plurality of financial assistance providers based on lender criteria, the computer system including: a digital electrical computer having a processor, the processor electrically connected to store and receive electrical signals at a memory device, to receive input electrical signals corresponding to input information from an input device, to convert output electrical signals into output information at an output device, the processor programmed to control the digital electrical computer to receive the input electrical signals and to process the input electrical signals to produce the output electrical signals in storing telephone numbers for a plurality of financial assistance providers in memory accessible by said digital electrical computer, storing lender-provided criteria for selecting one of the financial assistance providers, identifying a debtor in response to a telephone communication, and selecting one of the financial assistance providers by accessing the criteria, applying the criteria, and accessing one of the stored telephone numbers to connect the debtor to the one of the stored telephone numbers; especially as further including a telephone controlled by said digital electrical computer to connect the debtor by telephone to the one of the stored telephone numbers.

In any of the embodiments, the invention can be carried out as method for making a computer system to refer a telephone communication to one of a plurality of financial assistance providers based on lender criteria, the method including the steps of: providing a digital electrical computer having a processor, the processor electrically connected to store and receive electrical signals at a memory device, to receive input electrical signals corresponding to input information from an input device, to convert output electrical signals into output information at an output device; and programming the processor to control the digital electrical computer to receive the input electrical signals and to process the input electrical signals to produce the output electrical signals in storing telephone numbers for a plurality of financial assistance providers in memory accessible by said digital electrical computer, storing lender-provided criteria for selecting one of the financial assistance providers, identifying a debtor in response to a telephone communication, and selecting one of the financial assistance providers by accessing the criteria, applying the criteria, and accessing one of the stored telephone numbers to connect the debtor to the one of the stored telephone numbers.

In any of the embodiments, the invention can be carried out as a computerized method for providing call referral activity reporting at an Internet address, the method including the steps of: generating call referral data by receiving an inbound telephone communication from a referring apparatus of information sufficient to identify a referrer identity, selecting which one of a plurality of financial assistance providers to refer the inbound communication by using a computer to look up and to apply referral criteria responsive to the referrer identity, and connecting the inbound communication to the one of the plurality of the financial assistance providers in accordance with the criteria; and posting call referral data to the Internet web address.

In any of the embodiments, the invention can be carried out as further including the steps of: engaging accounting software to track compensation for the connecting.

Briefly, in the system of the present invention, and in the case of an intermediary, a telephone phone rings—collect ANI (originating number) and DNIS (number called) information. The DNIS number identifies the lender to the intermediary. The ANI information becomes important to help determine if the lender is doing a warm transfer or the consumers are calling themselves. Based on this information, the intermediary will later determine if this consumer called before and route them back to the correct (previous) agency.

Answer the call—time stamp. This step to mark the beginning of the call.

Prompt the caller for digits—credit card information—for routing back to the lender to identify the caller and track what became of the caller.

Authenticate the collected digits—i.e., credit card number.

Play a "Thank-You" message and place the caller on "hold."

Determine if consumer has called before: Previous caller; New caller; Default.

Perform routing table lookup—Using the DNIS and ANI information query the routing tables for an outbound number to agency.

Seize an outbound telephone channel (line).

Get the next outbound telephone number.

Dial the outbound number.

Was the call answered in 4 rings (valuable for report information); if not, check if there is another outbound number—shift from primary agency to secondary agency.

Connect caller to agency.

Wait for hang-up or call time-out—Monitor both sides of the conversation for a hang-up. If hang-up is detected, clean up resources.

Generate updated reports every two minutes, posted to a secure web site.

The Referral Management System (RMS) is not limited to just the credit counseling world.

A Receiver (someone who receives a referral) can be any of the following:
1. consumer credit counseling agency
2. home equity lender
3. debt consolidation or loan refinancer
4. bill paying service (automated or not)
5. commercial lender
6. financial planner or more particularly, an apparatus of the same.

A Referrer (someone who directs a call for the referral) can be any of the following:
1. creditor
2. employee assistance program (EAP)
3. professional employer organization (PEO)
4. membership services organization
5. labor unions
6. affinity groups
7. clubs
8. credit unions or more particularly, an apparatus of the same.

While the foregoing is a reasonable summary, it should be understood that the scope of the invention is defined by the claims subsequent hereto, and that variations on the preferred embodiment are intended to be embraced therein, particularly call referral without an intermediary, as for example by the lender itself directly connecting callers to credit counseling or other financial assistance agencies. Further detail is provided in the drawings and detailed discussion set out below.

IV. BRIEF DESCRIPTION OF THE DRAWINGS

FIG. 6 is an illustration of an embodiment a members screen in accordance with the present invention.

FIG. 8 is an illustration of an embodiment a report for levels one, two, and three in accordance with the present invention.

FIG. 9 is an illustration of an embodiment a report for levels four and five, and of a comparison to date, in accordance with the present invention.

FIG. 10 is an illustration of an embodiment a custom report screen in accordance with the present invention.

FIG. 11 is an illustration of an embodiment a report with analysis in accordance with the present invention.

V. DETAILED DESCRIPTION OF A PREFERRED EMBODIMENT

Figure 1:
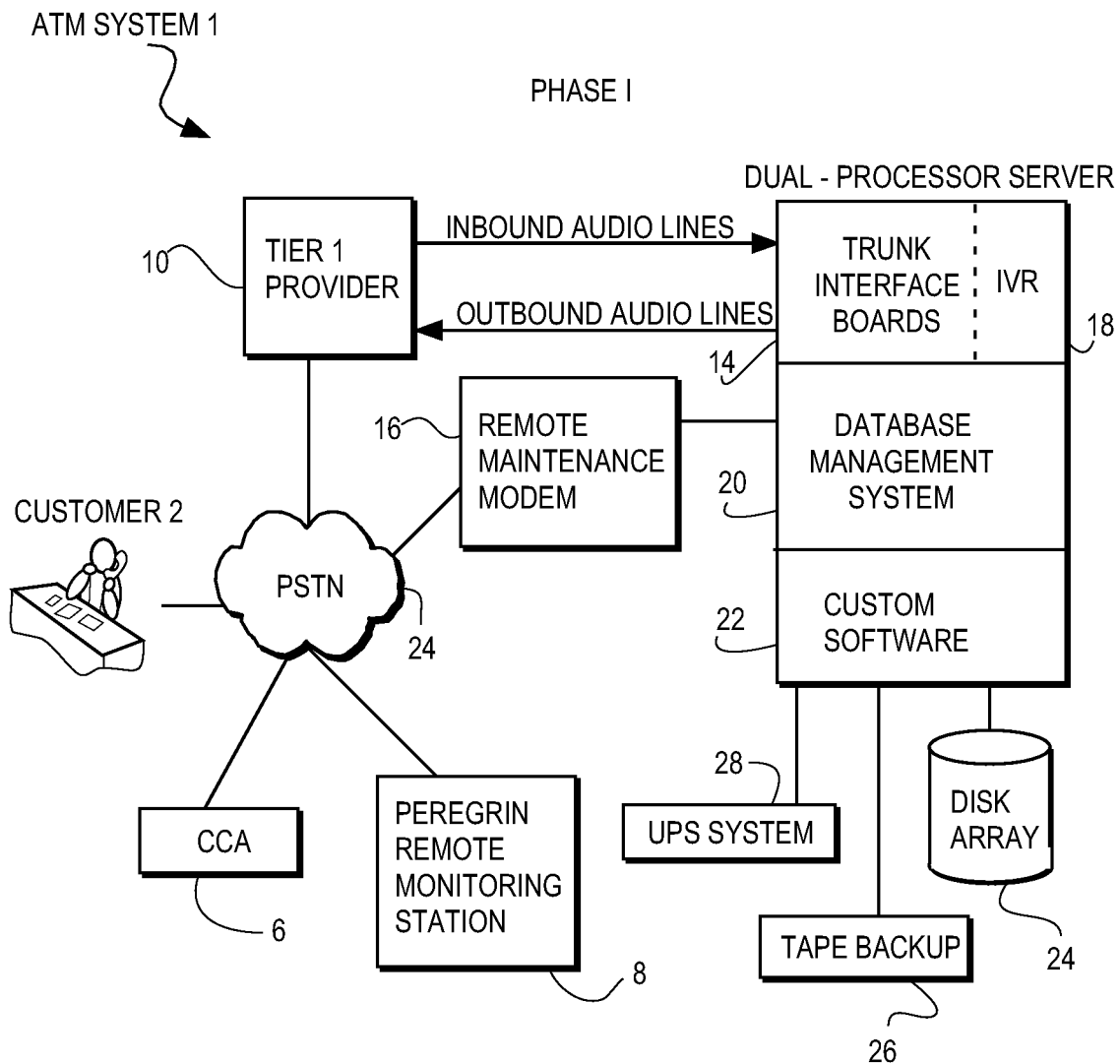
FIG. 1 is an illustration of an embodiment of the present invention.

Turning now to a detailed discussion of how to make and how to use the present invention, please refer to the code in the Appendix hereto, which is incorporated herein. Generally, with regard to making and operating the Referral Management System (RMS) 1 of the present invention, the following terminology is being used.
1. RMS Referral Management System
2. RT Routing Table
3. OBN Outbound Number
4. ANI Automated Number Identification (Originating number)
5. DNIS Dialed Number Identification Service (Toll-free called number)
6. IVR Interactive Voice Response
7. CCA Consumer Credit Agency
8. PSTN Public Switch Telephone Network
9. DTMF Dual Tone Multi-Frequency (Touch Tones)
10. Outbound Number—A Toll-Free number belonging to a particular CCA.
11. Default Outbound Number(s)—A Toll-Free number of a CCA to call in the event a database lookup fails.
12. Customer—Bank's customer; this individual is provided a PEREGRIN Toll-Free number, by the bank.

For a particular embodiment, consideration should be given to T1 interfaces, commercial software, custom software, and hardware products and other features; major factors include scalability, reliability, compatibility, functionality, available support, and short and long term cost. T1 trunking options from the Tier-1 Long Distance Exchange Carriers (LEC's) can be obtained by contracts with the LEC's. Equipment location can be such as SkyNetWeb, a co-location facility in Baltimore, Md., which provides the following:
1. Locked Cabinet (7'×30"×19")
2. Backup Power Generators
3. 24/7 Access to the equipment
4. Internet Access
5. Public Network Access A suitable IVR platform can be obtained from LCG, and database products, such as those from Oracle, Sybase, and Microsoft, can be considered for a particular application. Sybase can be chosen.

Hardware used for the RMS can include T1 interface boards (Dialogic, and BrookTrout), RAID options, memory, processing speed requirements, and Backup & Recovery options. Dialogic can be used, and RAID V can be chosen for the disk array to provide redundancy; XEON processors can be used for potential expansion of the System 1 with 512K of RAM.

A toll-free provider can be considered for the best cost effective plan for the particular embodiment, considering per minute cost, minimum monthly requirements, and length of contract. Spring Valley (a subsidiary of WorldCom) can be used.

Hardware can be comprised of the following RMS:

| Category | Description | Qty. |
|---|---|---|
| Motherboard | Intel C440GX Dual-Xeon | 1 |
| CPU | Intel Pentium III Xeon 550 MHz w/ 1 MB cache | 2 |
| Memory | 256 MB Synchronous DRAM | 2 |
| Boot Drive | Seagate Medalist 6.4 GB Ultra ATA/66 | 2 |
| Hard Drives | 9.1 GB IBM Ultra2-SCSI SCA LVD 80pin SCA 10,000 rpm | 4 |
| RAID Controller | PCI-Adaptec:AAA-131U2, 1 ch., Ultra2-SCSI, 64 MB Cache | 1 |
| CDROM | IDE 48X CDROM | 1 |
| OS | Windows NT Server 4.0, with 5 client licenses | 1 |
| Case | Intel Cabrillo-C Full Tower with 3 redundant 400 W Power Supplies | 1 |
| Pedestal Kit | Pedestal Kit for Cabrillo-C chassis | 1 |
| Floppy Drive | IDE 1.44 MB 3.5" | 1 |
| Keyboard | Windows PS2 104 Key | 1 |
| Mouse | Microsoft PS2 Intellimouse | 1 |
| Monitor | Viewsonic Optiquest Q51 15" .28dp | 1 |
| Modem | US Robotics External (56k w/voice) & Blaster External (56K w/voice) | 2 |
| NIC | ISA-3COM 10/100 MB Ethernet Card | 1 |
| Backup | Seagate Scorpion 12/24 SCSI2 Tape Backup | 1 |
| Backup Software | Seagate Backup Exec for Windows NT Version 7.3 Multi-Server | 1 |
| Warranty Maintenance | 3 yr Onsite, pageable, 7/24, 4 hour response | 1 |
| UPS | APC Smart UPS 700Net (w/ powerchute software and cable) | 1 |
| Remote Management | Intel PCI Card/Modem (Emergency Management Card) with Software | 1 |
| CSU | External T1 CSU's (one spare) | 3 |
| Database Management | Sybase Adaptive Server Anywhere (20 concurrent license) | 1 |
| IVR Platform | VBVoice-96 channel Professional Edition | 1 |
| T1 Boards | Dialogic SC/240 Single T1 Boards | 3 |

The trunk interface boards are Dialogic SC/240 T1 Interface boards. The IVR software was built using the Professional Version of Pronexus's VBVoice Toolkit. This software interfaces with the Dialogic T1 interface boards to answer the call, collect the ANI and DNIS information, prompt the Customer, initiate the Outbound Number database lookup, dial the Outbound Number and bridge the call between the Inbound Caller and the Outbound destination.

VBVoice is purchased based on number of channels that it will support. This support can always be upgraded but currently can support a maximum of ten T1's, e.g., the following version of VBVoice: VB Voice Professional 4.1-96 Channels (supports 4 T1's). This software support of four T1 circuits will allow for expansion of two more T1's without upgrading the VBVoice software The IVR Server has the following available 4 PCI slots for T1's. In the present implementation, there are three single T1 PCI boards. Two were immediately configured in the system and one is a spare. The initial capacity will be as follows: T1 Trunks—Two (Two PCI boards—One T1 per board): This allows for 24 simultaneous completed calls to the CCA's through the system. Initial call volume capacity is 20K calls/month (non-blocking).

Assumed the following average call criteria:
1. 24 Business Days per Month
2. 12 Business Hours per Day
3. 7 Minutes per Call With the above call criteria, the IVR system will average approximately 1 call per minute with a 20K calls/month load on the system.

The Referral Management System 1 (RMS) performs criteria-based call routing. A caller dials a nationwide toll-free number that enters into the RMS via PSTN T1 audio trunks. Data including originating number (ANI), and called number (DNIS) are sent in over the PSTN and are collected by the RMS system. From this data, the day of week, time of day, and geographic region are determined and are utilized in a routing table (RT) lookup. The caller is presented with a recorded greeting and a request to enter a credit card number (if this prompt is enabled), which is then captured by the RMS. If no number is entered or the number is determined to be an invalid credit card number, the caller is prompted again. With or without data from the first and second try, a recorded message is played and the transaction proceeds. A routing database lookup locates one main outbound number (OBN) and one or two default outbound numbers to dial depending on the routing model assigned to the toll-free called number (DNIS). The provided routing models are:
1. Default—One or two numbers assigned to a call if a DB lookup fails or primary call fails.
2. Statistical—Routing based on percentage of calls going to two or more agencies.
3. Time & Location—Routing based on where the call originated from (ANI).
4. Hybrid—Combination of the Statistical and Time & Location Models.

The RMS places the customer "on-hold" and dials the OBN, and then connects the Customer or caller once an answer is detected. If a busy signal or no answer (defined by a configurable number of rings) is encountered, the call is re-routed to a default OBN based on RT specifications.

The RMS will continue to monitor the call until a hang-up condition is detected. It will then database the total length of the call. The RMS stores the detailed data on each call into a database record which is sent to the PEREGRIN Web Server via a push process. This push process logs its activity and occurs at a configurable rate (e.g., every two minutes).

The following RMS requirements utilized in the development of the System 1.

A. IVR Application Requirements
1. Shall answer phone call and start timer.
2. Shall collect and/or database:
3. ANI Collected (Y or N)
4. Originating Number (ANI)
5. State call originated from (2 Digit)
6. Start Date of Call (DD/MM/YY)
7. Start Time of Call (HH:MM:SS)
8. End Time of Call (HH:MM:SS)
9. Length of Call (HH:MM:SS)
10. Called Number (DNIS)
11. Customer (i.e., caller) Entered Digits (16 max.)
12. Criteria Cell Matched
13. Number Call was attempted to . . .
14. Number Call was completed to . . .
15. Completion code (TRUE, FALSE)
16. Non-complete reason (busy, no answer, line failure)
17. Shall prompt Customer, if enabled, for a 13-16 digit number terminated by a pound sign and shall log an event for digit time outs. Shall be able to disable Customer prompting for digits for a given DNIS
18. Shall view an invalid digit as a digit timeout.
19. Shall database number entered by Customer.
20. Shall wait eight (8) seconds for Customer to enter the first digit before prompting the Customer for a number a second time.
21. Shall wait eight (8) seconds in between digits, before prompting the Customer for a number a second time.
22. Shall authenticate the number entered by the Customer and shall log an event should authentication fail.
23. Shall authenticate the number entered by the Customer when the maximum number of digits is entered regardless of whether or not a pound sign was entered.
24. Shall play a "Thank-you" message and proceed with the transfer if the second prompt fails in anyway.
25. Shall play a "Thank-you" message anytime the Customer properly enters the number.
26. Shall be prompted a maximum of two times before proceeding with the transfer.
27. Shall determine if Customer has called before only after a successful authentication.
28. Shall transfer Customer to the same Outbound Number used on their first call and shall NOT try another Outbound Number should this one fail.
29. Shall seize an outbound channel and send DTMF digits down the channel.
30. Shall interface to a Sybase database.
31. Shall query the Sybase database for a list of Outbound Numbers to Dial.
32. Shall record the total length of the call.
33. Shall log significant events.
34. Shall put Customer in HOLD state.
35. Shall play message or music while Customer is in HOLD state.
36. Shall play "THANK YOU" message after authentication succeeds or fails twice.
37. Shall ring the Outbound Number 4 times, if no answer, shall dial the next Outbound Number.
38. Shall dial the next Outbound Number if fast busy is detected.
39. Shall remove the Customer from the HOLD state and connect them to the "answered" Outbound Number.
40. Shall play an "apology" message if we fail to seize an outbound channel and shall log this event.

41. Shall detect if either side of conversation hangs up and do the following:
42. Clean up resources appropriately
43. Record the time
44. Shall log an event if a conversation exceeds a maximum time.
45. Shall log an event, play an "apology" message, and clean up resources if all Outbound Number dial attempts Fail.
46. Shall use a default Outbound Number if all Outbound Number database lookups fail.
47. Shall record time when Customer is connected to an "answered" Outbound Number.
48. Shall attempt to connect first time Customers to a maximum of three (3) different Outbound Numbers, 1 from the Routing Tables and 2 Defaults.
49. Shall attempt to connect Customers to the 2 Default Outbound Numbers in the event the Routing Table lookup fails.
50. Shall read a configuration file for basic system parameters:
51. Number of Rings to wait for an Outbound Number to answer
52. Maximum length of a call
53. Amount of Time to wait between digits
54. Maximum Number of Digits in prompted number
55. Minimum Number of Digits in prompted number
56. Database "push" interval
57. Shall be dynamically re-configurable
58. Shall play a custom greeting based on DNIS when the call is first answered.
59. Shall be able to modify or add custom greetings for the first prompt without re-compiling the system code.

B. Database Requirements
1. Shall be encrypted and written to a file every 24 hours.
2. Shall push the IVR table data out the network connection at a configurable interval.
3. Shall specify a Routing Model for all Inbound Numbers
4. Shall have three basic Routing Models and one Default. The three basic Routing Models are:
5. Statistical
6. Time Location
7. Hybrid
8. Routing Models shall key off the DNIS information
9. Shall provide three types of Lookups:
10. Previous Caller: For valid CCN's, shall determine if Customer has called before. If customer has called before and was connected to a CCA, then the previously dialed Outbound Number will be returned. If the Customer called before but was never connected to an Outbound Number then the Customer will be treated like a new caller and a New Caller Lookup will be performed.
11. New Caller: If the Customer has not called before or an invalid CCN was entered or the Customer has called before but was not connected then the Routing Model specified for the DNIS will be used to lookup one Outbound Number. Regardless of the specified Routing Model a Default Routing Model will always return two Outbound Numbers. When a Routing Model is not specified for a particular DNIS the Default Routing Model will be used.
12. Default: For each DNIS two CCA numbers will be specified, one primary and one secondary. This lookup will always return two outbound numbers.
13. Shall handle the following Routing scenarios:

| | Call Scenario | Lookup Description |
|---|---|---|
| 1 | DNIS not Collected | Go to Routing-Decision table, key off "not received" and use the specified Routing Model. |
| 2 | Invalid DNIS Collected (DNIS collected is not defined in our table) | Go to Routing-Decision table, key off "invalid" and use the specified Routing Model. |
| 3 | DNIS Collected, ANI not Collected | Go to Routing-Decision table, key off the received "DNIS" and use the specified Routing Model to get the first Outbound Number to dial. (This creates a unique routing issue if the TimeLocation Model was specified. There should be logic inside the TimeLocation Model to handle this scenario.) The IVR will use the Default Routing Model to lookup two more Outbound Numbers. A maximum of three Outbound Numbers will be tried for this Customer. |
| 4 | Both DNIS and ANI are Collected | Go to Routing-Decision table, key off the received "DNIS" and use specified Routing Model and use it to lookup one specific Outbound Number. Attempt to dial this CCA. The IVR will use the Default Model to lookup two default Outbound Numbers. A maximum of three Outbound Numbers will be tried for this Customer. |
| 5 | Bank requests:<br>XX % of the time call CCA #1<br>XX % of the time call CCA #2<br>.<br>.<br>.<br>XX % of the time call CCA #n<br>Primary Default<br>Secondary Default | Statistical Model: For each Inbound Number the bank will specify a certain number of Outbound Numbers (CCA's) with corresponding percentages. The total percentages must add up to 100%. If only one Outbound Number is specified then the percentage must be 100%. The model will be used to determine the first number to attempt.<br>DefaultModel: The bank will also specify two default number if the first attempt fails. |
| 6 | Bank requests:<br>State1 and TimePeriod1 to CCA #1<br>.<br>State1 and TimePeriod4 to CCA #2<br>. | Time Location Model: For each Inbound Number the bank will specify calls from a certain state and at a certain time period to be routed to a particular CCA. The Time Periods will be mutually exclusive. The number of Time Periods will be limited to four for each state. The model will be used to determine the first number to attempt. |

-continued

| Call Scenario | Lookup Description |
|---|---|
| StateN and TimePeriod1 to CCA #P . StateN and TimePeriod4 to CCA #Q Primary Default Secondary Default | DefaultModel: The bank will also specify two default number if the first attempt fails. |
| 7 Bank requests: State1 and TimePeriod1 to CCA #1 State2 and TimePeriod2 50% to CCA#2 50% to 10 other CCA's | Hybrid Model: This model combines the Statistical and TimeLocation Models into one Model so when a Customer calls from a particular location during a particular time range we can statistically route calls to the appropriate CCA. In addition we can route differently based on the day of the week. In particular we can discern between day of the week, weekends, and holidays. Default Model: The bank will also specify two default number if the first attempt fails. |

Overall system design and technical management for the RMS system includes the IVR System, Database Schema development, custom IVR application development, error recovery utilizing paging technologies, installation and testing, and future expansion and support plans.

FIG. 1 is an illustration of an embodiment of the present invention. FIG. 1 shows a customer 2 or caller connected by a channel to PTSN 4, which is centrally connected to a CCA 6, a Remote Monitoring Station 8 allows the referring bank to listen in on calls which are being transferred or sent to agencies, which may require a monitoring statement to be made when the call is be transferred advising the consumer that the call may be monitored, and Tier 1 Provider 10 of channels (in-bound and outbound audio lines), which connect via Dual Processor Server 12. Dual Processor Server 12 includes Trunk Interface Boards 14, which link to PSTN 4 via a Remote Maintenance System 16 is monitoring software which detects the condition or failure of key aspects of the IVR 18, such as temperature of the unit, hard drives working, etc., and sends a page to personnel if warning conditions occur. It also allows remote rebooting of the system, IVR 18 Database Management System 20, with Custom Software 22 is all of the steps detailed beginning with step 1. Collect ANI and DNIS at 30. This software analyzes the call, gathers information, presents it for routing and sends the call to the designated agency. Dual Processor Server 12 communicates with Disk Array 24, makes a tape back up 26, and interfaces with a courier system such as UPS System 28.

As to error recovery, the following paging requirements are for the RMS System 1 to recover from system faults and generate pages:
 1. Inbound T1 Fault
 2. Outbound T1 Fault
 3. Database Fault
 4. WebServer Not Accessible
 5. Switched to Backup Power There should be a continuous monitoring capability to detect problems with the RMS server such as temperature thresholds exceeded, memory errors, disk errors, and Operating System malfunctions.

With regard to the IVR subsystem, access to the Internet can be provided via a port on SkyNetWeb's switched Ethernet LAN. The access can be through MCI/Worldcom's UUNET. Thirty-two (32) IP addresses can be provided and 50 GB of data transfer per month can be supported.

For public network access, 24 in-bound audio channels (telephone lines or the like) can be provided by a Spring Valley/MCI WorldCom Dedicated T1 Trunk. There also can be 24 out-bound audio channels, which can be provided by a MCI WorldCom Local T1. Additional in-bound and out-bound audio channels can be provided by a Spring Valley/MCI WorldCom Dedicated T1 Trunk.

Figure 2:
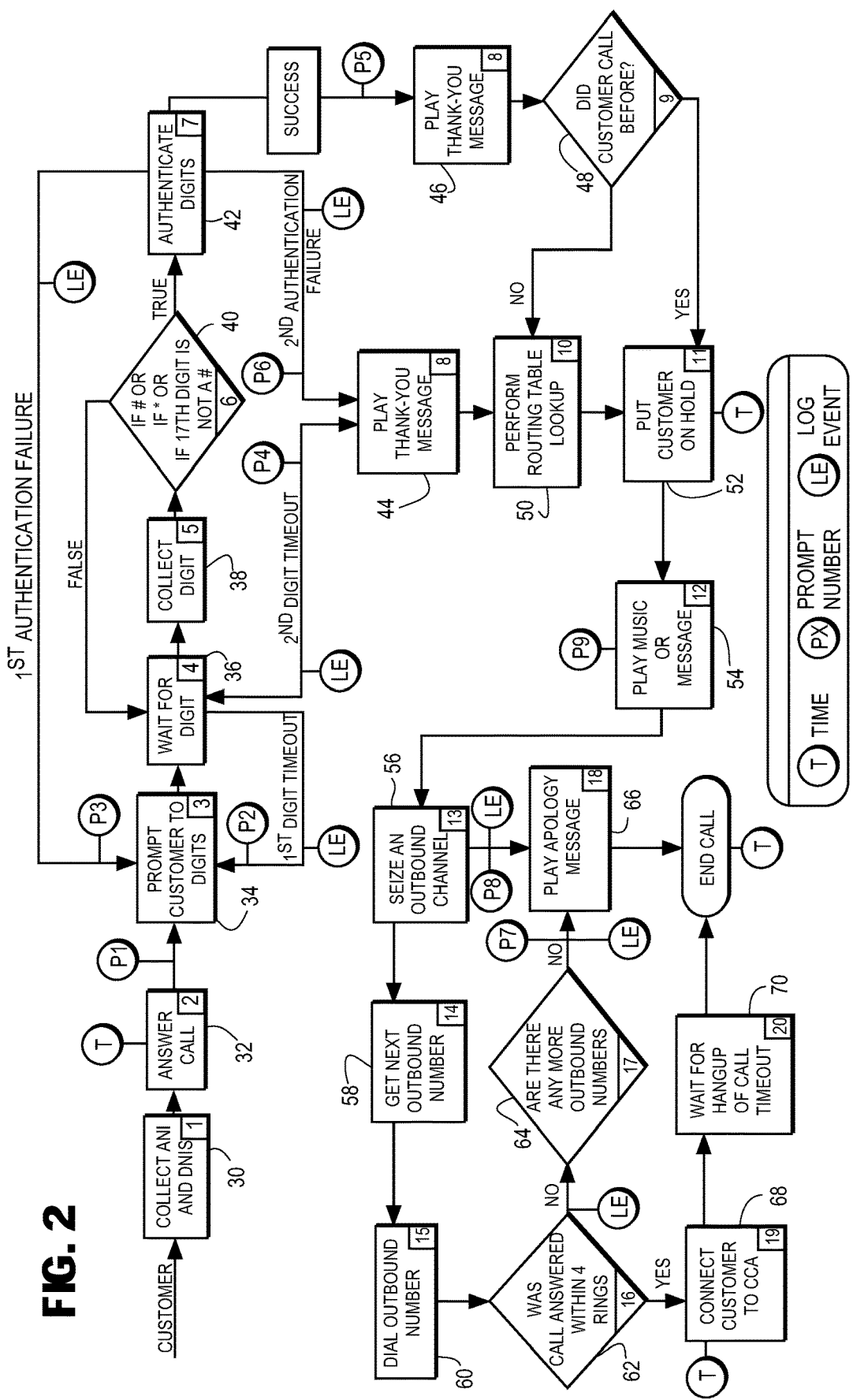
FIG. 2 is an illustration of an embodiment an IVR System diagram in accordance with the present invention.

FIG. 2 is an illustration of an embodiment an IVR System diagram in accordance with the present invention. The IVR application for the RMS 1 and the IVR Sub-System custom software 22 has the following description.
 1. Collect ANI and DNIS at 30;
 2. Answer Call at 32: Time stamp this step to mark the beginning of the call.
 3. Prompt Customer for Digits at 34: After answering the Call, prompt Customer for digits using Prompt 1. After the first digit timeout prompt Customer for digits using Prompt 2 and after the first authentication failure prompt the Customer for digits using Prompt 3.
 4. Wait for Customer to enter a DTMF digit at 36: The first time the Customer fails to enter a digit, log an event, and re-prompt the Customer for digits using Prompt 2. The second time the Customer fails to enter a digit, log and event, and prompt the Customer using Prompt 4. The Customer has maximum amount of time to enter a digit and this will be specified by the digit timeout parameter. This parameter will be dynamically re-configurable.
 5. Collect a DTMF digit at 38.
 6. Validate the Collected digits at 40: Proceed to step 7 and authenticate the collected digits if any of the following cases are TRUE:
  If the digit is a pound (#) at 40
  If the digit is a star (*) at 40
  If the $17^{th}$ digit is NOT a pound (#) at 40
  If NONE of the above cases are TRUE then proceed to step 36 and wait for another digit.
 7. Authenticate collected digits at 42: Do the following checks in the following order:
  Invalid digits (star *)
  Minimum number of digits required
  Maximum number of digits allowed
  Subject the collected string of digits (minus the pound (#) sign) to provided authentication algorithm.
  The first time any of the above checks FAIL, log an event and re-prompt the Customer for digits using Prompt 3. The second time any of the above checks FAIL, log an event and prompt the Customer using Prompt 6.
8. Play a "Thank-you Message at 44: Depending on how a Customer gets to this step one of three different prompts will be played.
9. Play a "Thank-you Message at 46: Depending on how a Customer gets to this step one of three different prompts will be played.
10. Determine if Customer called before at 48: Only when authentication is successful, perform a database lookup into the Customer Tables to determine if the current Customer has called in the past. When doing this search in the database we should only have to search calls which have authenticated properly. This should speed up this query. This step is performed in an effort to reconnect past Customers to the same Outbound Number every time, provided they always enter their account number properly.
11. Perform Routing Table Lookup at 50: Using the DNIS and ANI information query the routing tables for an Outbound Number.
12. Put Customer on HOLD at 52: Customer must be put on HOLD while the IVR system dials the Outbound Number. Time stamp this step so we can monitor how long we keep a Customer on HOLD.
13. Play Music or a Message at 54: While the Customer is on HOLD play music or use Prompt 9.
14. Seize an Outbound Channel at 56: If this succeeds proceed to step 14, if it fails, log an event and play the Customer message using Prompt 8.
15. Get the Next Outbound Number at 58: Get the next Outbound number to dial. If the Customer has called before then there will only be one number on this list. If this is a first time caller and the routing table lookup was successful then there will be 3 numbers on this list (1 from routing tables and 2 defaults). If this is a first time caller and the routing table lookup failed, then there will only be 2 numbers on this list (the 2 defaults).
16. Dial the Outbound Number at 60: Send DTMF tones down the outbound trunk corresponding to the Outbound number. (Dial the CCA)
17. Was Call Answered within 4 Rings at 62: If it was then proceed to step 19
18. Are there any more Outbound Numbers at 64: If the Called party fails to answer within the first 4 rings, for any reason, then we end up here. If there are more Outbound numbers to dial go to step 14, if not, log an event and Play an apology message specified by Prompt 7.
19. Play "Apology" Message at 66: Depending on how a Customer gets to this step one of two different prompts will be played
20. Connect Customer to CCA at 68: Time stamp this step and calculate the amount of time it took the IVR system to connect the Customer to an appropriate destination.
21. Wait for Hang-up or Call Time-Out at 70: Monitor both sides of the conversation for a hang-up. If hang-up is detected, clean up resources (trunks, etc.) and time stamp this step so the total length of call can be calculated. If hang-up is NOT detected before the call duration reaches the maximum allowed, log an event, time stamp and clean up resources (hang-up).

Turning now to the IVR Sub-System Database Management System 20 (FIG. 1), the Sybase product, Adaptive Server Anywhere can provide database Management for the RMS. A Push application was developed to transfer database content required by the Web Sub-System over the network connecting the two sub-systems. The timing of this push is controlled by a setting in a configuration (setting indicates the number of minutes between pushes). For example, if set to "2" will push the data every two minutes. To make the push more efficient, only the new records since the last push are sent to the Web Server.

Figure 3:
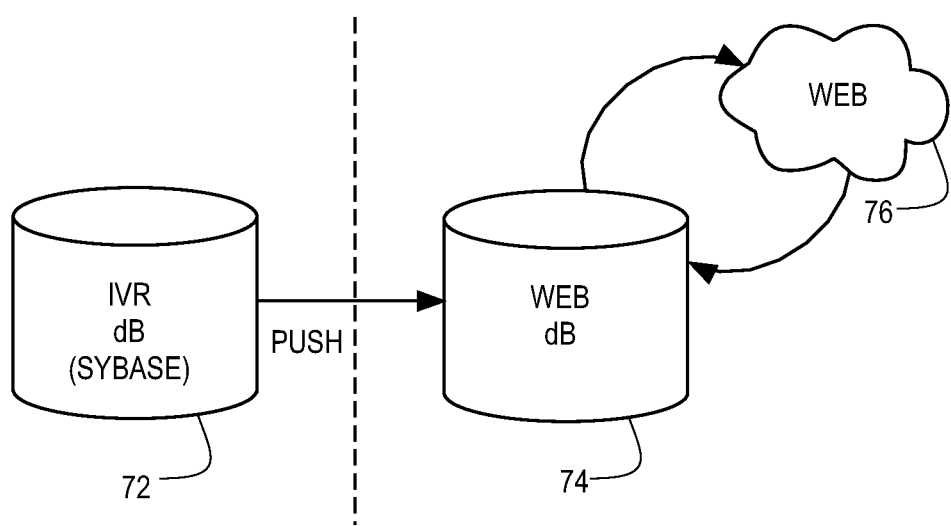
FIG. 3 is an illustration of an embodiment an IVR High Level diagram in accordance with the present invention.

The IVR Sub-System of Database Management System 20 interfaces with the Web Sub-System shown in FIG. 3. Components include IVR Database 72, Web database 74, which communicates to a global network such as the Internet World Wide Web 76. Benefits Include:
 1. Protects integrity of IVR Database
 2. Redundancy
 3. Optimized Web Database for Web Reporting
 4. Removes reliance of Web Server on IVR Database (split sisters)

Figure 4:
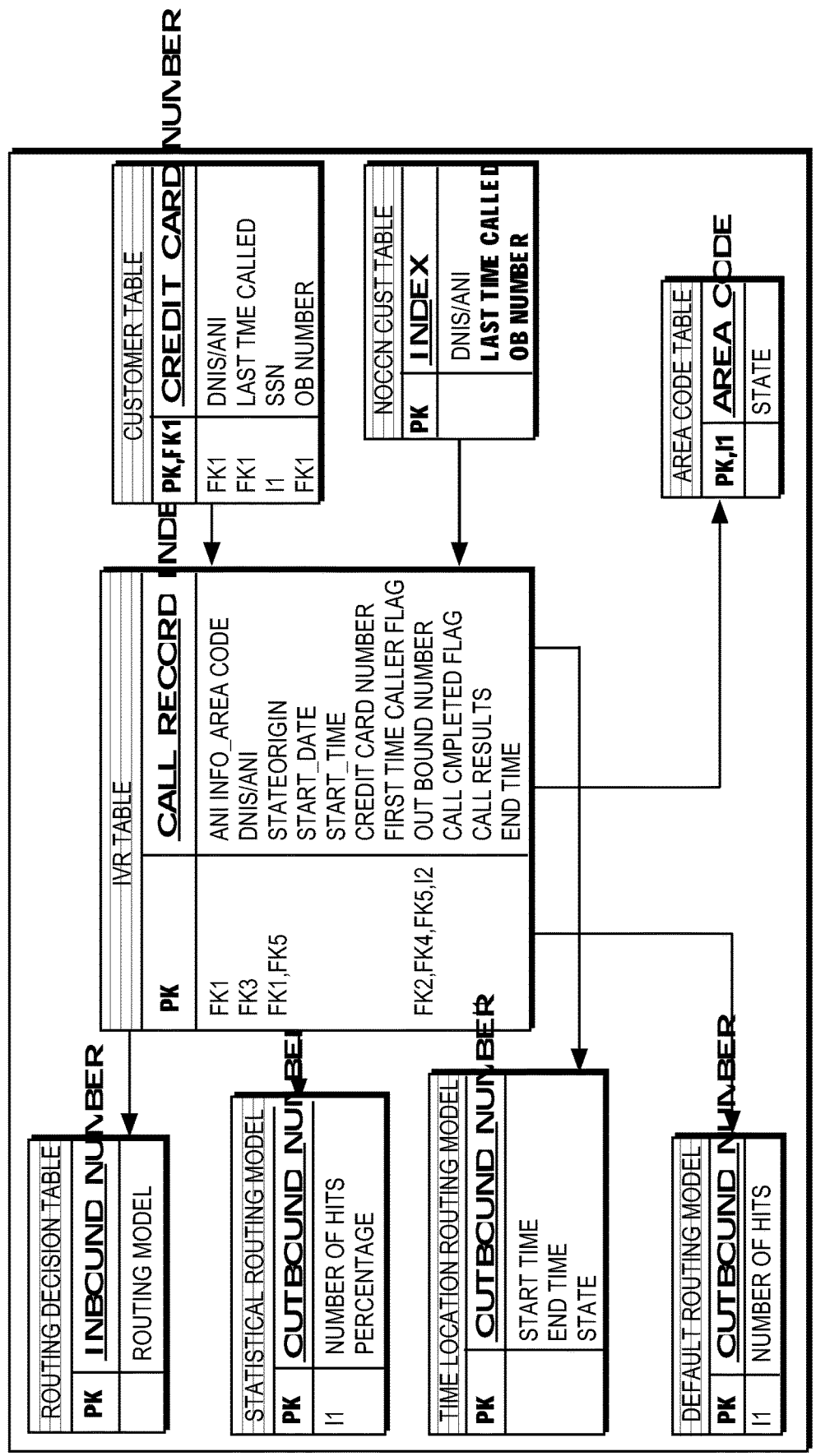
FIG. 4 is an illustration of an embodiment an IVR Database Schema in accordance with the present invention.

Database Schema is shown in FIG. 4 which is the routing model and data for each referrers' inbound lines. With regard to the Website (e.g., for access to reports), it is advisable to utilize a browser, such as Internet Explorer 4.0 or higher, or Netscape Navigator 4.0 or higher, etc., preferably with 128-bit encryption (SSL).

Internet Explorer
 1. Select Help on the menu bar
 2. Choose About Internet Explorer from the drop down menu
 3. The number in the "Cipher Strength" field is the encryption strength Netscape
 1. Select Help on the menu bar
 2. Choose About Navigator or About Communicator from the drop down menu
 3. Scroll down and look to the left for the statement that begins, "This version supports U.S. Security with RSA Public Key Cryptography." That indicates a 128-bit encryption level.

Preferably the invention is carried out with a secure web site, for example, using Secured Sockets Layer (SSL) for secure transmissions. SSL applies encryption between two communicating applications, such as the Referrer Computer and the System Internet server. When the Referrer Computer transmits data over the Internet, the data is encrypted or "scrambled" at the sending end and then decrypted or "unscrambled" at the receiving end. Encryption is a technology that allows secure transmittal of information along the Internet by encoding the transmitted data using a mathematical formula that scrambles it. Without a corresponding "decoder," the transmission would look like nonsense text and would be unusable. It can be used with many applications, including electronic commerce (sending credit card numbers for orders or transmitting account information), e-mail messages and sensitive documents. The System uses digital signatures and 128-bit encryption to identify users and to ensure that information exchanged online is safe from interception and alteration.

Additionally, the Web Site requires a unique User ID and Password. Thereafter, each time a Referrer Computer is used in a sign-on, the user's identity is confirmed by a series of authenticating steps. After authentication, a "cookie" is planted in the Referrer Computer system to identify the referrer Computer Preferably the invention is carried out so that the browser must accept "cookies". A browser may be set to receive cookies automatically or to notify of cookies. Either way is acceptable. If the browser is set to notify, a user may receive a notice that the server wishes to set a cookie when the user accesses secure areas of the Web Site.

Put simply, a "cookie" is a small piece of information about a computer's identity. There are two kinds of cookies—"persistent" and "transient." A persistent cookie, once installed, remains on the hard drive of a computer. Preferably, a transient cookie is used, which is not permanently stored on the Receiver Computer hard drive and is not available to anyone other than the System. The cookie contains information that allows the System to maintain continuity from one page to another as the referrer Computer navigates the site and reports. All information is securely encrypted through the use of SSL as described above.

Accessing the Web Site is carried out in the usual manner of entering the correct Internet address the Referrer Computer's browser address bar and hitting "enter." At this point, the System Website security validates the IP address and approach. Once a main screen appears, the referrer Computer can be used to "bookmark" the page for future easy reference.

Figure 5:
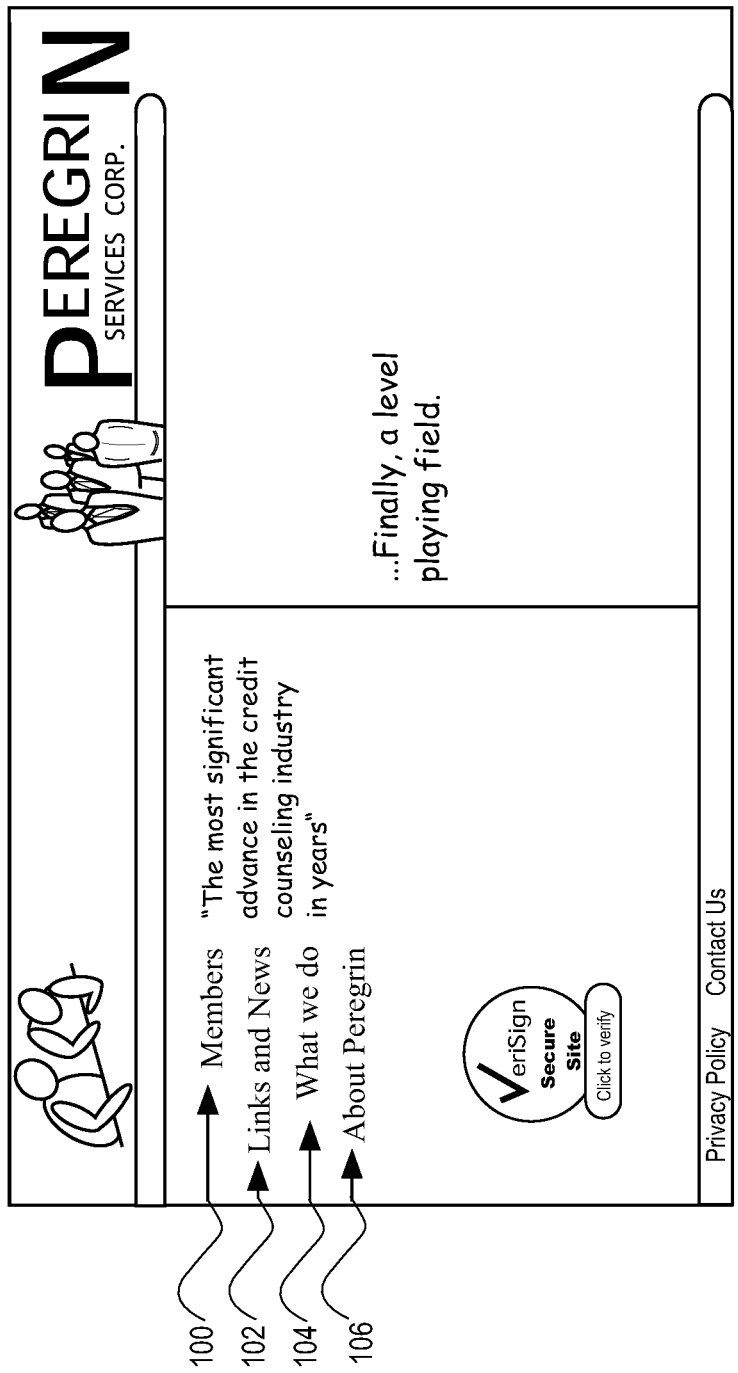
FIG. 5 is an illustration of an embodiment a main screen in accordance with the present invention.

From the main screen in FIG. 5, a user of the Referrer Computer can choose:

Members 100—a secure part of the Website, requiring a login id previously obtained from the System by using a CONTACT US button to obtain a login id. The user can access all reports by this means.

Links and News 102—links for both financial and industry purposes, and news that is pertinent to the industry. Use the CONTACT US button at the bottom of the page to suggest a link.

What we do 104—all about the System for receivers and referrers. New visitors can enroll to become a receiver or referrer or view a tutorial by clicking on the links here.

About us 106—all about the System and its related team—as the enterprise grows.

As the user moves a mouse pointer over any of these items, a description of the function appears to its right in the green area, replacing the verbiage there. At any time, anywhere in the site, the user can use a browser's "Back" button to return to a previous page. Or, click on the "nav" bar name to go right to that report or section. To go to the main page, FIG. 5, simply click on a HOME in the bottom left of any screen, or click on the System logo (in this case, Peregrin) in the upper right.

Turning now to using the embodiment of the present invention in connection with reporting, subsequent to the above-mentioned login, a user can move a mouse pointer over a MEMBERS button and click once. The user is then taken to a member login screen, FIG. 6. The user enters a User Name and password here. If the user has not enrolled, or forgotten a password, the user can click on the highlighted text below the login screen to send an email to the System automatically for assistance.

Once the user has entered a User Name and password, clicked on a SUBMIT button, and a summary for the login level appears. The user's login level will show referrals for a particular area of responsibility as defined by the user's administrator. The user's senior management may see all referrals by all departments within their areas of responsibility, while other department areas may see referrals from just their areas of responsibility. Some users who access reports frequently find it helpful to bookmark this page instead of the main page.

A login can be set to stay active for a fixed period of time, say, 30 minutes of inactivity, so if the user leaves the Referrer Computer for more than 30 minutes, the user will be automatically logged off the System. As long as the User is active within the time period, the user will not be automatically logged off, unless, of course, the user closes the browser.

Figure 7:
FIG. 7 is an illustration of an embodiment a members summary screen in accordance with the present invention.
Figure 12:
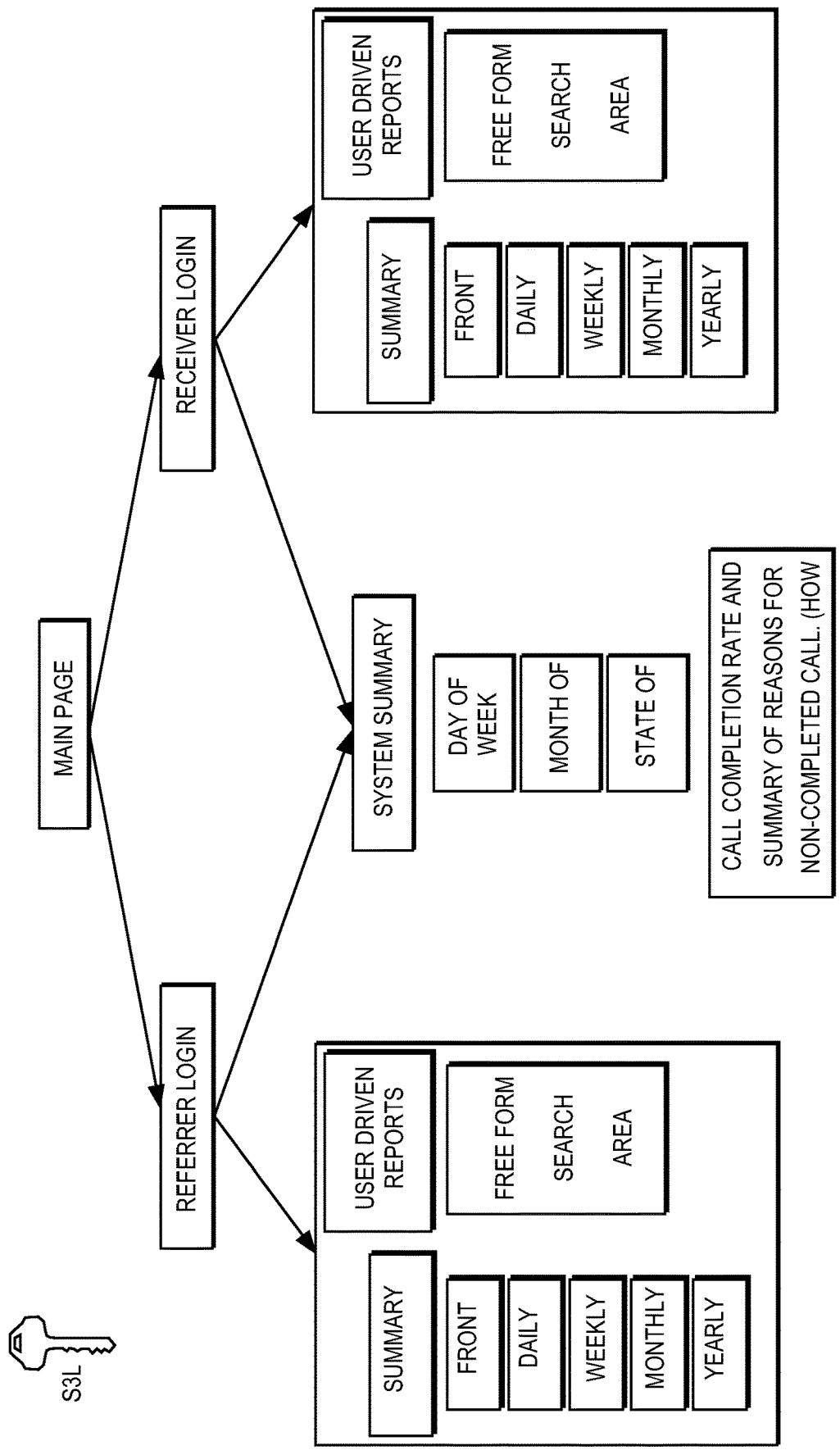
FIG. 12 is an illustration of an embodiment a report map in accordance with the present invention.

A Member Summary Screen, FIG. 7, is provided upon a successful login. This screen identifies the user and the location associated with the user. The user will be able to view reports for all referrals from this location. To come back to this summary at any time, simply click on a MEMBER SUMMARY button.

As to the Referrer reports, there are several buttons (options), such those illustrated on the left-hand navigation bar (navigation bar) of FIG. 7, DAILY REPORTS, 7 DAY REPORTS, 30 DAY REPORTS, AND YEAR REPORTS, which function identically for different time periods. MONTHLY or other periods could similarly be used.

DAILY REPORTS reflect the current day beginning at 12:00:01 AM of the day the user inquires. 7 DAY REPORTS reflect the last 7 days ending at 12:59:59 PM the day before the user inquires. 30 DAY REPORTS reflect the last 30 days ending at 12:59:59 PM the day before the user inquires. YEAR REPORTS show the last 365 days ending at 12:59:59 PM the day before the user inquires. For specific date ranges, such as a calendar week, month, or year, use CUSTOM REPORTS.

Many of the higher-level reports include two powerful and useful buttons in the left most columns of FIG. 8 (in connection with FIG. 9). Click the DRILL DOWN button to get more information on any line that has a bold heading. For instance, from the monthly summary page Drill Down will take the user to a listing of each day's activity by receiver. Click on any bold entry from there to see a listing of unique callers on any one day. And Click on any bold entry from there to see callers with duplicate identification information. The user can learn more about drilldown reports below.

Click the COMPARE button to go to a sub-report listing comparative information on all referrers that the receiver uses. Examples:

When viewing a summary report, notice that call completion rates and talk time have decreased at one of the receivers. When the user clicks on the COMPARE button for that receiver, the user sees that the receiver now has two new referrers making referrals. This new referral volume could be affecting the service level the receiver has been providing to user, which may warrant investigation.

When the user clicks the COMPARE button for one receiver, the user may see that the Referrer makes up a majority of the referrals that this receiver is getting. Perhaps other referrers have not discovered the value this receiver can offer; perhaps other referrers have been in a similar referral relationship with this referrer before and have discovered it to be to their disadvantage to be dependent on one agency.

Whatever the reason, this information may warrant further investigation. Preferably referrer identities are not generally displayed, and volumes are shown as percentages of the total referrals to that receiver to maintain confidentiality of referrers. As a more particular example, consider YEARLY REPORTS.

The YEARLY REPORTS provide a snapshot of the user's Referring Institution, including referral data to all receivers in the last 365 days. The receiver name in level one can be clicked to visit the receiver's website, if there is one.

As always, click the browser's BACK button to return to the previous report, or click on a report name to go there directly.

Click on the DRILL DOWN button to proceed to level two, the next level of detail. Here the user will see summary information for each of the previous 12 months for the receiver identified by clicking on a corresponding button. The date column in Level 2 is bold for every month in which there have been more than one referral made to this receiver.

Then, click on a bold month to go to Level 3 for a summary of referrals for the month to that receiver. There is one row for each day that there were referrals. Clicking on a bold date (Bold indicates that there was more than one referral made to that receiver that day) takes the user to level 4 where all referrals for that date are listed by Time of Call.

If any of the credit card numbers are bold in level 4 there are multiple records for that credit card number (even if the credit card number is shown as a 0), providing the user with the ability to drill down to level five.

Level five displays all matching records for the clicked card number.

Examples of YEARLY REPORTS are shown in FIGS. 8-9. At level one, the date range is listed on top of the report. Click on the DRILL DOWN button for more detail on any receiver. At level two, the receiver name and date range are at the top of the report. There is one row for each calendar month. Months with multiple referrals are bold. Click on any Bold Month for detail by date of call. At level three, the receiver name and date range are at the top of report. There is one row for each date of referrals. Dates with multiple referrals are bold. Click on any Bold Dates for detail by caller's account number and origination. At level four, there is shown each card number entered for each call and the originating phone number for calls made to the receiver selected in level 1 for the day clicked in the previous level. Receiver name and date range are listed at the top of report. Records are sorted by time of day from most recent. There is one entry per unique identifier, i.e., credit card number. Multiple entries are Bold. (Click on Bold card numbers for more detail.) Zero is displayed if no card number was entered. At level five, in the case of multiple calls having the same card number, this report will show each of the calls made with that account number. Account number is listed at the top of the report. Originating phone number, time, date, and length of each call is listed.

Using COMPARE is a very powerful tool that permits a user to view other receivers being used by a referrer. Click on COMPARE next to the name of any receiver to see statistics such as those in FIG. 9, where the user will see its organization listed first, and all other referrers using that receiver will be listed (without identification) below that. This report enables easily comparison against other referrers at this agency, e.g., by:

1. Call completion rates
2. Phone times
3. Share of referrals contributed
4. Referrals to one receiver versus another
5. And, this report enables benchmarked performance questions:
6. What percent of referrals do are contributed to this agency?
7. Are call lengths longer or shorter? Is this better or worse? Does the referrer's call lengths contribute to returns/conversions/counseling effectiveness?
8. Is the referrer getting the service level for the share of referrals contributed?
9. Are a lot of referrers using this receiver? Why or why not?
10. Has the receiver started serving more or less referrers? Why? How does this affect service levels?
11. How does this receiver's performance with all referrers compare to other receivers?

Turning now to use of the CUSTOM REPORTS feature, this menu option provides the ability to construct a custom search of the referral database. The user is greeted with a custom search area similar to the one shown in FIG. 10. This search interface allows manipulation of all of the report variables in order to refine a search to meet a user's particular needs. These reports will display the requested information in a table. The user also can have the option to download these reports in a format which can be imported to a word processor or spreadsheet (like Microsoft Word™ or Excel™).

Turning now to FIG. 10 to use of the SUMMARY REPORTS feature, this menu option provides System members with anonymous summary information that reaches across all receivers and referrers. These reports produce real-time summary calculations on all records in the current database (maximum of 365 days). See FIG. 8, Level One.

Turning now to use of the TIME OF DAY/DAY OF WEEK REPORTS feature, this menu option provides a report of frequency data on caller activity based on a 7-day week. Data is provided for each day of the week with a drill down link on each day to provide information on an hourly breakdown. Currently summarizes all System 1 activity; but can also summarize by login. See FIG. 8, Level Two, where the user may drilldown on any Bold entry by clicking on it to see referral distribution by hour of the day.

Turning now to use of the TIME OF MONTH REPORTS feature, this menu option provides a report of frequency data on caller activity by calendar month of the year and time of the month. Data is provided for each month with a drill down link on bold months to a daily breakdown. Currently summarizes all Peregrin activity; later will also summarize by login. See FIG. 8, Level 3, where the user may drilldown on any Bold entry by clicking on it to see referral distribution by day of the month.

Turning now to use of the STATE OF ORIGIN REPORTS feature, this menu option provides a report of frequency data on caller activity based on the state of origin. Data is provided for each state. Data is sorted by state. This report does not have drill-down functionality. Currently summarizes all activity; but can also summarize by login. See FIG. 9, Level Four.

Turning now to use of the STATE OF ORIGIN REPORTS feature, this menu option provides a report to users with a summary of overall call completion rates across all receivers and referrers. The report also provides a percentage breakout on the causes for incomplete calls. Currently summarizes all activity; but can also summarize by login. See FIG. 9, Level Five.

An illustration of an embodiment a report screen for analysis is provided in FIG. 10, and a schematic view of the site reports is provided in FIG. 11.

Not shown on the Figs. is an accounting system, such as QuickBooks™, which can operate on a computer of the intermediary, either independently or in connection to the System 1 of FIG. 1 to account for compensation for call referral, such as a flat fee for each call referral, the fee being paid, for example, by the financial assistance center receiving the call referral.

Turning now to the operational standards for the website, particularly the specifications and configurations of the web server, firewall server, and related software and hardware, consider first a general overview of the SQL database used to drive the website. The website maintains a simple but secure multi-server design. The firewall server, which protects the network from unauthorized access, is a Windows NT Server configured with Axent Raptor Software. The web server is another NT Server running Internet Information Server, Cold Fusion, and Microsoft SQL server.

Figure 13:
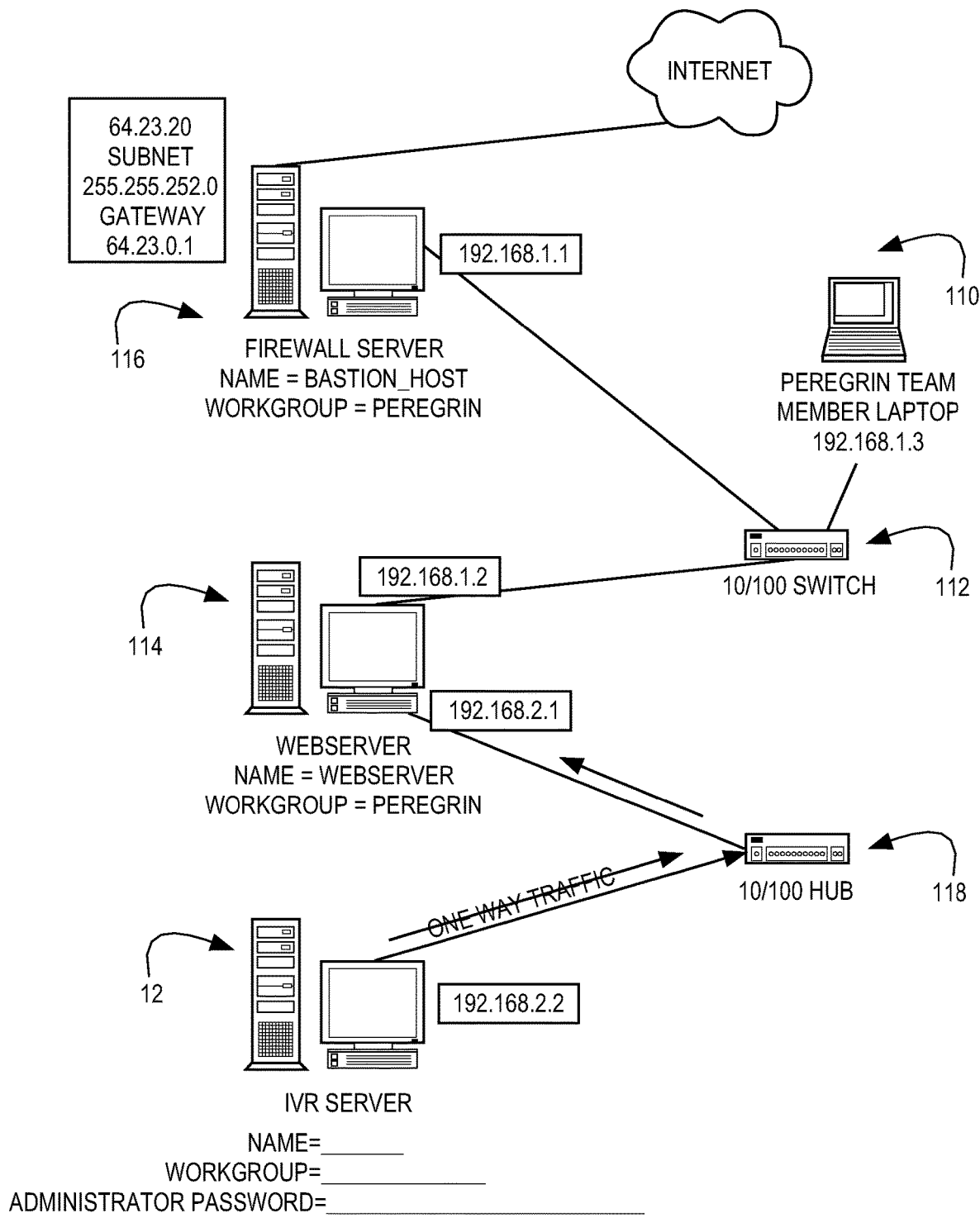
FIG. 13 is an illustration of an embodiment a network in accordance with the present invention.

When an Internet user (via computer 110) requests a page from the domain, the request is routed via switch 112 to SkyNetWeb, the DNS authority and ISP (Internet Service Provider). SkyNetWeb has a WebServer 114 with a routing table entry which redirects all requests to the intermediary's IP address (64.23.0.20), which has been assigned to the first network card in the Firewall. A Raptor server redirects the request from the firewall to the web server through a port 80 connection. The web server does not have an external Internet IP address. The web server is connected to the Firewall server using an internal IP address range 9192.168.XXX.XXX). The only device that is exposed to the Internet is the Firewall server 116, as illustrated in FIG. 13.

Each of the three servers, including the IVR Server 12, is configured as a member server of a workgroup.

The Firewall Server 116 can, for example, be as follows: LCG Server; Windows NT Product ID Number 26699-OEM-0044587-97975; Intel Pentium III, 600 Mhz Processor (single processor); 256 MB RAM; 2×6.4 GB Hard Drives operating in a RAID configuration; 3×10/100 Network Cards (Intel); Top Card—Connected to WAN with blue cable; Middle Card—Connected to internal network with RED cable; Bottom Card—Currently inactive; Dual-redundant power supplies; 15 inch Optiplex monitor; CD-Drive; Floppy Drive. And the software can be Axent Raptor—Version 5.5; Internet Explorer; CuteFTP; Windows NT Server 4.0; Service Pack 5; Raptor Mobile VPN Software.

The firewall server 116 is configured to block all unauthorized Internet traffic. The minimum required ports have been left open:

| Inbound traffic on port | Will resolve to |
|---|---|
| 80 (http) | Port 80 on the web server |
| 443 (SSL) | Port 443 on the web server |
| Outbound traffic from the web server on port | Will be routed to the Internet from port |
| 25 (SMTP) | 25 on the Firewall |

The firewall server 116 can be installed with 3 Network Interface Cards (NIC) configured as follows:
Card 1: External Internet Exposure
(Top Card) IP Address: 64.23.0.20
Card 2: Internal Network between the Firewall and Web servers
(Middle Card) IP Address: 192.168.1.1
Card 3: Inactive card (Could be used to configure another domain)
(Bottom Card) IP Address (10.1.1.1)

All web-based communication uses the TCP/IP protocol stack. The Raptor Firewall 116 can be configured to run as an NT service with automatic start-up. Upon restart, all Raptor services will automatically resume.

There are two physical drives in the server. Each drive has an 8.4.GB capacity. The drives are partitioned into three volumes (C, D, and E). All relevant data is currently being stored on the C partition. D and E are currently empty except for a CuteFTP application directory on E. CuteFTP was used to download various applications and updates to the network. It should not put network security at risk. Raptor Firewall does a very good job of disabling insecure NT services. The following services are currently running on the Firewall server 116:

Eventlog
Plug and Play
Raptor Firewall
Remote Procedure Call (RPC)
Spooler
TCP/IP NetBios Helper
Workstation The WebServer 114 can, for example, be LCG Server; Windows NT Key 26699-OEM-0044587-97975; 2× Intel Pentium III, 550 Mhz Processors (dual processor); 512 MB RAM; 3×9.1 GB SCSI Hard Drives operating in a RAID 5 configuration; 2×10/100 Network Cards (Intel); Dual-redundant power supplies; 15 inch Optiplex monitor (model no—VCDTS21487-3M); CD-Drive; and a Floppy Drive. Similarly, the software can be Windows NT Server 4.0, Service Pack 5; Internet Information Server 4; Cold Fusion Professional Server, Version 4.5; Microsoft SQL Server 7 (Dual Processor, Unlimited Internet Connector Licenses); Web Trends Log Analyzer; Internet Explorer; and PC Anywhere Version 9.

The WebServer 114 can be configured to accept Internet requests, process results, and pass formatted result pages back to the Internet. The Webserver 116 completes this task by using Internet Information Server as the core web server application, Microsoft SQL server 7 as the database engine, and Allaire Cold Fusion 4.5 as the middle-ware application to translate database content into properly formatted web pages.

When a client calls the 800 number in search of a CCA, the details of the phone call are recorded in the IVR database 20. Preferably in real time, but also doable is every 1-3 minutes, the IVR database pushes new call records to a Microsoft SQL 7 database on the WebServer 114. CCA and Creditor members then query the call record database to retrieve relevant information. Cold Fusion Application Server formats this information into HTML.

The WebServer 114 has two network cards that allow the Webserver 114 to route data requests between the Web/Firewall network and the Web/IVR network. The network cards can be configured as follows:
Card 1: Web/Firewall Card
    IP Address: 192.168.1.2
Card 2: Web/IVR Card
    IP Address: 192.168.2.1

Microsoft IIS, Cold Fusion Server, SQL Server, PC Anywhere, and WebTrends have been configured to run as NT services with automatic start-up. Upon restart, all above-mentioned services will automatically resume.

The WebServer 114 has been installed with 3×9.1 GB hard drives operating in a RAID 5 array. This configuration serves as a first line of defense against system failure. All data is being maintained on three hard disks.

All data on the web server RAID array (drive G) is being backed up to tape each night.

There are 5 physical drives located in the Webserver 114. The first two IDE drives are 4 GB in size. These drives are being used as boot drives. They are divided into two, GB partitions (C and D). An NT based RAID mirror has been established between the drives to insure reliability. The IDE boot drives are not being backed up to tape.

The remaining three drives, 9.1 GB SCSI configured in a RAID 5 array with an Adaptec 64 MB RAID adapter card, work together to create the G partition. This partition contains all data, cold fusion application files, and html files. Most program directories are also stored in this directory. This entire directory is being backed up to tape each night. Pangia technologies is managing the backup process. There are currently over 16 GB of free space on the G drive, and the following NT services can be running:
Alerter
Certificate Authority
Cold Fusion Application Server
Cold Fusion Executive
Cold Fusion RDS
Computer Browser
Content Index
Event
FTP Publishing Service (Port turned off by Firewall)
IIS Admin Service
License Logging Service
Message
Microsoft SMTP Service
MSDTC
MS SQLServer
NT LM Security Support Provider
PC Anywhere Host Service
Plug and Play
Protected Storage
Remote Procedure Call Service
Server
Spooler
SQL ServerAgent
TCP/IP NetBios Helper
Web Trends Scheduler
Workstation
World Wide Web Publishing Service As to the switch 112 is used to connect the Firewall server 116 to the WebServer 114. The IVR 112 server is connected to the web server with a hub 118.

| | |
|---|---|
| Switch | NetGear Fast Ethernet Switch Model Number DS105 |
| Hub | NetGear 10/100 Autosensing Model Number DS104 |

Each of the servers and related equipment can be protected from power inconsistencies and outages by UPS systems. The WebServer 114 is connected to a stand-alone SmartUPS 700 made by APC: Model Number: SU700NET. The firewall server 116 is connected to a stand-alone SmartUPS 700 made by APC: Model Number: SU700NET.

With regard to the Appendix, incorporated here by reference, consider the following logic design dictionary:

Entity Summary Report

| Entity Name | Entity Type | Primary Keys | # Attr |
|---|---|---|---|
| Bank | Independent | BankId | |
| CCA | Independent | CCAId | |
| CDATA | Independent | | |
| CGLOBAL | Independent | | |
| IVR_Table | Independent | call_record_index | |
| Member | Independent | MemberId | |
| role | Independent | RoleID | |
| State | Independent | StateCd | |
| TestANI | Independent | TestANITx | |
| Tmplt | Independent | TmpltId | |
| TmpltText | Independent | TmpltTextId | |
| userrole | Independent | UserRoleID | |
| users | Independent | UserId | |

Bank
Entity Name Bank
Primary Keys BankId
Definition The Bank table contains all information specific to a bank/referrer. There are two types of "bank" entries to be found here. These have been designated as a "main office", or a "branch". If a user is assigned to a main office they may also be given access to see all subordinate "branch" office data.
Notes
Attributes

| Attribute/Role Name | Domain | Datatype | Null | Definition |
|---|---|---|---|---|
| BankId/ | | INTEGER | ID | auto-generated number to used as the primary key of the table. |
| BankParentId/ | | INTEGER | Y | The BankId of the parent (main office) bank entry in this table. |
| DNIS/ | | VARCHAR(12) | N | The DNIS (800 number) a customer uses to contact the bank. This field relates to the DNIS field in the IVR_Table. |
| BankNameTx/ | | VARCHAR(50) | N | The name of the bank. |
| BankAddrss1Tx/ | | VARCHAR(50) | Y | The address (line 1) of the bank. |
| BankAddrss2Tx/ | | VARCHAR(50) | Y | The address (line 2) of the bank |
| BankCityTx/ | | VARCHAR(50) | Y | The city in which the bank is located. |
| StateCd/StateCd | | VARCHAR(2) | Y | The state in which the bank islocated. |
| BankZipTx/ | | VARCHAR(12) | Y | The zip code in which the bank is located |
| BankPhoneTx/ | | VARCHAR(12) | Y | The phone number of the bank. Possibly a contact number for someone at the bank. |
| BankFaxPhoneTx/ | | VARCHAR(12) | Y | The fax number for the bank. |
| BankWebSiteURLTx/ | | VARCHAR(50) | Y | The URL of the banks website (if any) |
| BankInuseIn/ | | BIT | N | Indicates if the bank is "in use" in the site. This field is used to "turn off" banks without having to delete them from the system. |

-continued

| Attribute/Role Name | Domain | Datatype | Null | Definition |
|---|---|---|---|---|
| BankDptTx/ | | VARCHAR(20) | Y | The department of the bank branch. The department indicates the level of late accounts the particular bank branch deals with. The department designations are: 30 day, 60 day, 90 day, 120 day, Charge Off. |
| BankParentIn/ | | BIT | N | Indicates if the bank is a "main office" entry. |
| BankCreateDt/ | | DATETIME | Y | Date record was created. |
| BankModifyDt/ | | DATETIME | Y | Date Record was last updated. This is set via an updated table trigger. |
| BankChangeTx | | VARCHAR(75) | Y | The user id of the person to last create or modify the record. The SQL Server login is used as the default (via an update table trigger) if no application specific id was given. |

BankId

| Attribute Name | BankId | Entity Name | Bank |
|---|---|---|---|
| Primary Key YES | | | |
| Foreign Key NO | Parent Entity | | |

Definition
auto-generated number to used as the primary key of the table.

BankParentId

| Attribute Name | BankParentId | Entity Name | Bank |
|---|---|---|---|
| Primary Key NO | | | |
| Foreign Key NO | Parent Entity | | |

Definition
The BankId of the parent (main office) bank entry in this table.

DNIS

| Attribute Name | DNIS | Entity Name | Bank |
|---|---|---|---|
| Primary Key NO | | | |
| Foreign Key NO | Parent Entity | | |

Definition
The DNIS (800 number) a customer uses to contact the bank. This field relates to the DNIS field in the IVR_Table.

BankNameTx

| Attribute Name | BankNameTx | Entity Name | Bank |
|---|---|---|---|
| Primary Key NO | | | |
| Foreign Key NO | Parent Entity | | |

Definition
The name of the bank.

BankAddrss1Tx

| Attribute Name | BankAddrss1Tx | Entity Name | Bank |
|---|---|---|---|
| Primary Key NO | | | |
| Foreign Key NO | Parent Entity | | |

Definition
The address (line 1) of the bank.

BankAddrss2Tx

| Attribute Name | BankAddrss2Tx | Entity Name | Bank |
|---|---|---|---|
| Primary Key NO | | | |
| Foreign Key NO | Parent Entity | | |

Definition
The address (line 2) of the bank

BankCityTx

| Attribute Name | BankCityTx | Entity Name | Bank |
|---|---|---|---|
| Primary Key NO | | | |
| Foreign Key NO | Parent Entity | | |

Definition
The city in which the bank is located.

StateCd

| Attribute Name | StateCd | Entity Name | Bank |
|---|---|---|---|
| Primary Key NO | | | |
| Foreign Key YES | Parent Entity | | State |

Definition
The state in which the bank is located.

BankZipTx

| Attribute Name | BankZipTx | Entity Name | Bank |
|---|---|---|---|
| Primary Key NO | | | |
| Foreign Key NO | Parent Entity | | |

Definition
The zip code in which the bank is located
BankPhoneTx

| Attribute Name | BankPhoneTx | Entity Name | Bank |
|---|---|---|---|
| Primary Key NO | | | |
| Foreign Key NO | Parent Entity | | |

Definition
The phone number of the bank. Possibly a contact number for someone at the bank.
BankFaxPhoneTx

| Attribute Name | BankFaxPhoneTx | Entity Name | Bank |
|---|---|---|---|
| Primary Key NO | | | |
| Foreign Key NO | Parent Entity | | |

Definition
The fax number for the bank.
BankWebSiteURLTx

| Attribute Name | BankWebSiteURLTx | Entity Name | Bank |
|---|---|---|---|
| Primary Key NO | | | |
| Foreign Key NO | Parent Entity | | |

Definition
The URL of the banks website (if any)
BankInuseIn

| Attribute Name | BankInuseIn | Entity Name | Bank |
|---|---|---|---|
| Primary Key NO | | | |
| Foreign Key NO | Parent Entity | | |

Definition
Indicates if the bank is "in use" in the site. This field is used to "turn off" banks without having to delete them from the system.
BankDptTx

| Attribute Name | | BankDptTx | Entity Name | Bank |
|---|---|---|---|---|
| Primary Key | NO | | | |
| Foreign Key | NO | Parent Entity | | |

Definition
The department of the bank branch. The department indicates the level of late accounts the particular bank branch deals with. The department designations are: 30 day, 60 day, 90 day, 120 day, Charge Off.
BankParentIn

| Attribute Name | | BankParentIn | Entity Name | Bank |
|---|---|---|---|---|
| Primary Key | NO | | | |
| Foreign Key | NO | Parent Entity | | |

Definition
Indicates if the bank is a "main office" entry.
BankCreateDt

| Attribute Name | | BankCreateDt | Entity Name | Bank |
|---|---|---|---|---|
| Primary Key | NO | | | |
| Foreign Key | NO | Parent Entity | | |

Definition
Date record was created.
BankModifyDt

| Attribute Name | | BankModifyDt | Entity Name | Bank |
|---|---|---|---|---|
| Primary Key | NO | | | |
| Foreign Key | NO | Parent Entity | | |

Definition
Date Record was last updated. This is set via an updated table trigger.
BankChangeTx

| Attribute Name | | BankChangeTx | Entity Name | Bank |
|---|---|---|---|---|
| Primary Key | NO | | | |
| Foreign Key | NO | Parent Entity | | |

Definition
The user id of the person to last create or modify the record. The SQL Server login is used as the default (via an update table trigger) if no application specific id was given.
CCA
Entity Name CCA
Primary Keys CCAId
Definition The CCA table contains all information specific to CCA's/Receiver's.
Notes
Attributes

| Attribute/Role Name | Domain | Datatype | Null | Definition |
|---|---|---|---|---|
| CCAId/ | | INTEGER | ID | auto-generated number used as the primary key of the table. |
| CCANameTx/ | | VARCHAR(50) | Y | Name of the CCA/Receiver. |
| CCAAddrss1Tx/ | | VARCHAR(50) | Y | First address line of the CCA |
| CCAAddrss2Tx/ | | VARCHAR(50) | Y | Second address line of the CCA. |
| CCACityTx/ | | VARCHAR(50) | Y | City in which the CCA is located. |
| StateCd/ StateCd | | VARCHAR(2) | Y | State in which the CCA is located. |
| CCAZipTx/ | | VARCHAR(12) | Y | The zip code in which the CCA is located. |

-continued

| Attribute/Role Name | Domain | Datatype | Null | Definition |
|---|---|---|---|---|
| CCAPhoneTx/ | | VARCHAR(12) | Y | A phone number for the CCA, possibly a specific contact within the company. |
| CCAFaxPhoneTx/ | | VARCHAR(12) | Y | The fax number for the CCA |
| CCAWebSiteURLTx/ | | VARCHAR(80) | Y | The URL of the CCA's web site (if any) |
| CCABillCntctId/ | | VARCHAR(12) | Y | *Unknown*, this field was included in the table layout provided but not currently in use. |
| CCAIVRPhoneTx/ | | VARCHAR(12) | Y | The phone number used by IVR routing system to connect customers with the CCA. This field directly ties back to the outbound_number fields (0, 1, 2) in the IVR_Table. |
| CCAInuseIn/ | | BIT | N | Indicates if the CCA is "in use" in the system. This field is used to "turn off" a CCA without removing the record from the database. |
| CCATypeTx/ | | VARCHAR(20) | Y | The type/level of service provided by the CCA. Current valid values are: Walk In, Phone Only, Both. |
| CCAAffltn/ | | VARCHAR(10) | Y | The affiliation membership of the CCA. Current valid values are: AICCCA, NFCC, None. |
| CCACreateDt/ | | DATETIME | Y | Date the record was created. |
| CCAModifyDt/ | | DATETIME | Y | Date the record was last modified. (set via an update table trigger) |
| CCAChangeTx/ | | VARCHAR(75) | Y | User id that last created or modified the record. By default the SQL Server login is used if no application specific user id was given. |

CCAId

| Attribute Name | | CCAId | Entity Name | CCA |
|---|---|---|---|---|
| Primary Key | YES | | | |
| Foreign Key | NO | Parent Entity | | |

Definition
auto-generated number used as the primary key of the table.
CCANameTx

| Attribute Name | | CCANameTx | Entity Name | CCA |
|---|---|---|---|---|
| Primary Key | NO | | | |
| Foreign Key | NO | Parent Entity | | |

Definition
Name of the CCA/Receiver.
CCAAddrss1Tx

| Attribute Name | | CCAAddrss1Tx | Entity Name | CCA |
|---|---|---|---|---|
| Primary Key | NO | | | |
| Foreign Key | NO | Parent Entity | | |

Definition
First address line of the CCA
CCAAddrss2Tx

| Attribute Name | | CCAAddrss2Tx | Entity Name | CCA |
|---|---|---|---|---|
| Primary Key | NO | | | |
| Foreign Key | NO | Parent Entity | | |

Definition
Second address line of the CCA.
CCACityTx

| Attribute Name | | CCACityTx | Entity Name | CCA |
|---|---|---|---|---|
| Primary Key | NO | | | |
| Foreign Key | NO | Parent Entity | | |

Definition
City in which the CCA is located.
StateCd

| Attribute Name | | StateCd | Entity Name | CCA |
|---|---|---|---|---|
| Primary Key | NO | | | |
| Foreign Key | YES | Parent Entity | State | |

Definition
State in which the CCA is located.
CCAZipTx

| Attribute Name | CCAZipTx | Entity Name | CCA |
|---|---|---|---|
| Primary Key | NO | | |
| Foreign Key | NO | Parent Entity | |

Definition
The zip code in which the CCA is located.
CCAPhoneTx

| Attribute Name | CCAPhoneTx | Entity Name | CCA |
|---|---|---|---|
| Primary Key | NO | | |
| Foreign Key | NO | Parent Entity | |

Definition
A phone number for the CCA, possibly a specific contact within the company.
CCAFaxPhoneTx

| Attribute Name | CCAFaxPhoneTx | Entity Name | CCA |
|---|---|---|---|
| Primary Key | NO | | |
| Foreign Key | NO | Parent Entity | |

Definition
The fax number for the CCA
CCAWebSiteURLTx

| Attribute Name | CCAWebSiteURLTx | Entity Name | CCA |
|---|---|---|---|
| Primary Key | NO | | |
| Foreign Key | NO | Parent Entity | |

Definition
The URL of the CCA's web site (if any)
CCABillCntctId

| Attribute Name | CCABillCntctId | Entity Name | CCA |
|---|---|---|---|
| Primary Key | NO | | |
| Foreign Key | NO | Parent Entity | |

Definition
**Unknown**, this field was included in the table layout provided but not currently in use.
CCAIVRPhoneTx

| Attribute Name | CCAIVRPhoneTx | Entity Name | CCA |
|---|---|---|---|
| Primary Key | NO | | |
| Foreign Key | NO | Parent Entity | |

Definition
The phone number used by IVR routing system to connect customers with the CCA. This field directly ties back to the outbound_number fields (0,1,2) in the IVR_Table.
CCAInuseIn

| Attribute Name | CCAInuseIn | Entity Name | CCA |
|---|---|---|---|
| Primary Key | NO | | |
| Foreign Key | NO | Parent Entity | |

Definition
Indicates if the CCA is "in use" in the system. This field is used to "turn off" a CCA without removing the record from the database.
CCATypeTx

| Attribute Name | CCATypeTx | Entity Name | CCA |
|---|---|---|---|
| Primary Key | NO | | |
| Foreign Key | NO | Parent Entity | |

Definition
The type/level of service provided by the CCA. Current valid values are: Walk In, Phone Only, Both.
CCAAffltn

| Attribute Name | CCAAffltn | Entity Name | CCA |
|---|---|---|---|
| Primary Key | NO | | |
| Foreign Key | NO | Parent Entity | |

Definition
The affiliation membership of the CCA. Current valid values are: AICCCA, NFCC, None.
CCACreateDt

| Attribute Name | CCACreateDt | Entity Name | CCA |
|---|---|---|---|
| Primary Key | NO | | |
| Foreign Key | NO | Parent Entity | |

Definition
Date the record was created.
CCAModifyDt

| Attribute Name | CCAModifyDt | Entity Name | CCA |
|---|---|---|---|
| Primary Key | NO | | |
| Foreign Key | NO | Parent Entity | |

Definition
Date the record was last modified. (set via an update table trigger)
CCAChangeTx

| Attribute Name | CCAChangeTx | Entity Name | CCA |
|---|---|---|---|
| Primary Key | NO | | |
| Foreign Key | NO | Parent Entity | |

Definition
User id that last created or modified the record. By default the SQL Server login is used if no application specific user id was given.
CDATA
Entity Name CDATA
Primary Keys
Definition Internal Coldfusion table used to track users and associated system variables.
Notes
Attributes

| Attribute/Role Name | Domain | Datatype | Null | Definition |
|---|---|---|---|---|
| cfid/ | | CHAR(20) | Y | |
| app/ | | CHAR(64) | Y | |
| data/ | | LONG VARCHAR | Y | | cfid

| Attribute Name | cfid | Entity Name | CDATA |
|---|---|---|---|
| Primary Key | NO | | |
| Foreign Key | NO | Parent Entity | |

Definition app

| Attribute Name | app | Entity Name | CDATA |
|---|---|---|---|
| Primary Key | NO | | |
| Foreign Key | NO | Parent Entity | |

Definition data

| Attribute Name | data | Entity Name | CDATA |
|---|---|---|---|
| Primary Key | NO | | |
| Foreign Key | NO | Parent Entity | |

Definition
CGLOBAL
Entity Name CGLOBAL
Primary Keys
Definition Internal Coldfusion table used to track users and associated system variables.
Notes
Attributes

| Attribute/Role Name | Domain | Datatype | Null | Definition |
|---|---|---|---|---|
| cfid/ | | CHAR(20) | Y | |
| data/ | | LONG VARCHAR | Y | |
| lvisit/ | | DATETIME | Y | | cfid

| Attribute Name | cfid | Entity Name | CGLOBAL |
|---|---|---|---|
| Primary Key | NO | | |
| Foreign Key | NO | Parent Entity | |

Definition data

| Attribute Name | data | Entity Name | CGLOBAL |
|---|---|---|---|
| Primary Key NO | | | |
| Foreign Key NO | Parent Entity | | |

Definition lvisit

| Attribute Name | lvisit | Entity Name | CGLOBAL |
|---|---|---|---|
| Primary Key NO | | | |
| Foreign Key NO | Parent Entity | | |

Definition
IVR_Table
Entity Name IVR_Table
Primary Keys call_record_index
Definition The IVR_table contains transaction records from the IVR system. It is used as the core table for all reporting done in the web site. This table is "replicated" from the IVR system and is essentially "read only" in our site.
Notes
Attributes

| Attribute/Role Name | Domain | Datatype | Null | Definition |
|---|---|---|---|---|
| call_record_index/ | | NUMERIC(18, 0) | ID | Automatically increments by one - used to uniquely identify each call into the IVR system. |
| ani/ | | VARCHAR(12) | Y | this represents the ani digits we received. |
| ani_info_areacode/ | | INTEGER | Y | this is the area code part of the received ani |
| ani_info_phone_number/ | | VARCHAR(12) | Y | this is the number part of the received ani |
| StateCd/StateCd | | VARCHAR(2) | Y | this is the state identifier which was determined by the IVR system (always has a value) |
| call_completed_flag/ | | INTEGER | Y | =call was completed 0 = call was not completed |
| credit_card_number/ | | VARCHAR(26) | Y | this represents the digits entered for the credit card number. |
| dnis/ | | VARCHAR(12) | Y | this represents the DNIS digits that were received. |
| dnis_valid/ | | INTEGER | Y | Y = received DNIS was found by our routing models N = received DNIS was not found by our routing models |
| start_datetime/ | | DATETIME | Y | Date and Time call was answered by the IVR System (always has a value) |

-continued

| Attribute/Role Name | Domain | Datatype | Null | Definition |
|---|---|---|---|---|
| end_datetime/ | | DATETIME | Y | Date and Time call was ended (always has a value) |
| call_duration/ | | INTEGER | Y | Number of seconds representing the duration of the call (always has a value) |
| exception_code0/ | | INTEGER | Y | Exception code for first CCA number dialed exception codes: 0 = No problems or never attempted to dial number 27 = No Dial Tone 28 = Fast Busy 29 = Busy 30 = No Answer 31 = No Ring 36 = Unknown (tbd) |
| exception_code1/ | | INTEGER | Y | Exception code for second CCA number dialed exception codes: 0 = No problems or never attempted to dial number 27 = No Dial Tone 28 = Fast Busy 29 = Busy 30 = No Answer 31 = No Ring 36 = Unknown (tbd) |
| exception_code2/ | | INTEGER | Y | Exception code for third CCA number dialed exception codes: 0 = No problems or never attempted to dial number 27 = No Dial Tone 28 = Fast Busy 29 = Busy 30 = No Answer 31 = No Ring 36 = Unknown (tbd) |
| first_time_caller_flag/ | | INTEGER | Y | =this is a repeat caller 1 = this is a first time caller 2 = caller hung up phone before digits entered could be validated |
| outbound_number0/ | | VARCHAR(50) | Y | First CCA Number to try (0 indicates caller hung up before we had a chance to lookup the CCA numbers in the routing tables) |
| outbound_number1/ | | VARCHAR(12) | Y | Second CCA Number to try (this is 0 for a repeat caller, this is also 0 when the first CCA number is 0) |
| outbound_number2/ | | VARCHAR(12) | Y | Third CCA Number to try (this is 0 for a repeat caller, this is 0 when the default routing model is the only model accessed, this is 0 when the first CCA number is 0) |
| final_called_number/ | | VARCHAR(12) | Y | the CCA number which was successfully connected too is stored here |
| web_upload/ | | INTEGER | Y | web side doesn't need to worry about this column (note from the web side: this is an internal indicator field for the ivr replication mechanism to determine if the system of origin hasa replicated the data to the web reporting database) |
| hold_datetime/ | | DATETIME | Y | Date and Time of when caller was put on HOLD, blank if call was terminated before caller was put on hold. |
| connect_datetime/ | | DATETIME | Y | Date and Time of when caller was connected to CCA, blank if call was terminated before caller was connected. | call_record_index

| Attribute Name | call_record_index | Entity Name | IVR_Table |
|---|---|---|---|
| Primary Key YES | | | |
| Foreign Key NO | Parent Entity | | |

Definition
Automatically increments by one—used to uniquely identify each call into the IVR system.
ani

| Attribute Name | ani | Entity Name | IVR_Table |
|---|---|---|---|
| Primary Key NO | | | |
| Foreign Key NO | Parent Entity | | |

Definition
this represents the ani digits we received.
ani_info_areacode

| Attribute Name | ani_info_areacode | Entity Name | IVR_Table |
|---|---|---|---|
| Primary Key NO | | | |
| Foreign Key NO | Parent Entity | | |

Definition
this is the area code part of the received ani
ani_info_phone_number

| Attribute Name | ani_info_phone_number | Entity Name | IVR_Table |
|---|---|---|---|
| Primary Key NO | | | |
| Foreign Key NO | Parent Entity | | |

Definition
this is the number part of the received ani
StateCd

| Attribute Name | StateCd | Entity Name | IVR_Table |
|---|---|---|---|
| Primary Key NO | | | |
| Foreign Key YES | Parent Entity | State | |

Definition
this is the state identifier which was determined by the IVR system (always has a value)
call_completed_flag

| Attribute Name | call_completed_flag | Entity Name | IVR_Table |
|---|---|---|---|
| Primary Key NO | | | |
| Foreign Key NO | Parent Entity | | |

Definition
=call was completed 0=call was not completed
credit_card_number

| Attribute Name | credit_card_number | Entity Name | IVR_Table |
|---|---|---|---|
| Primary Key NO | | | |
| Foreign Key NO | Parent Entity | | |

Definition
this represents the digits entered for the credit card number.
dnis

| Attribute Name | dnis | Entity Name | IVR_Table |
|---|---|---|---|
| Primary Key NO | | | |
| Foreign Key NO | Parent Entity | | |

Definition
this represents the DNIS digits that were received.
dnis_valid

| Attribute Name | dnis_valid | Entity Name | IVR_Table |
|---|---|---|---|
| Primary Key NO | | | |
| Foreign Key NO | Parent Entity | | |

Definition
Y=received DNIS was found by our routing models
N=received DNIS was not found by our routing models
start_datetime

| Attribute Name | start_datetime | Entity Name | IVR_Table |
|---|---|---|---|
| Primary Key NO | | | |
| Foreign Key NO | Parent Entity | | |

Definition
Date and Time call was answered by the IVR System (always has a value)
end_datetime

| Attribute Name | end_datetime | Entity Name | IVR_Table |
|---|---|---|---|
| Primary Key NO | | | |
| Foreign Key NO | Parent Entity | | |

Definition
Date and Time call was ended (always has a value)
call_duration

| Attribute Name | call_duration | Entity Name | IVR_Table |
|---|---|---|---|
| Primary Key NO | | | |
| Foreign Key NO | Parent Entity | | |

Definition
Number of seconds representing the duration of the call (always has a value)
exception_code 0

| Attribute Name | exception_code0 | Entity Name | IVR_Table |
|---|---|---|---|
| Primary Key | NO | | |
| Foreign Key | NO | Parent Entity | |

Definition
Exception code for first CCA number dialed exception codes: 0=No problems or never attempted to dial number 27=No Dial Tone 28=Fast Busy 29=Busy 30=No Answer 31=No Ring 36=Unknown (tbd)
  exception_code 1

| Attribute Name | exception_code1 | Entity Name | IVR_Table |
|---|---|---|---|
| Primary Key | NO | | |
| Foreign Key | NO | Parent Entity | |

Definition
Exception code for second CCA number dialed exception codes: 0=No problems or never attempted to dial number 27=No Dial Tone 28=Fast Busy 29=Busy 30=No Answer 31=No Ring 36=Unknown (tbd)
  exception_code 2

| Attribute Name | exception_code2 | Entity Name | IVR_Table |
|---|---|---|---|
| Primary Key | NO | | |
| Foreign Key | NO | Parent Entity | |

Definition
Exception code for third CCA number dialed exception codes: 0=No problems or never attempted to dial number 27=No Dial Tone 28=Fast Busy 29=Busy 30=No Answer 31=No Ring 36=Unknown (tbd)
  first_time_caller_flag

| Attribute Name | first_time_caller_flag | Entity Name | IVR_Table |
|---|---|---|---|
| Primary Key | NO | | |
| Foreign Key | NO | Parent Entity | |

Definition
=this is a repeat caller 1=this is a first time caller 2=caller hung up phone before digits entered could be validated
  outbound_number 0

| Attribute Name | outbound_number0 | Entity Name | IVR_Table |
|---|---|---|---|
| Primary Key | NO | | |
| Foreign Key | NO | Parent Entity | |

Definition
First CCA Number to try (0 indicates caller hung up before we had a chance to lookup the CCA numbers in the routing tables)
  outbound_number 1

| Attribute Name | outbound_number1 | Entity Name | IVR_Table |
|---|---|---|---|
| Primary Key | NO | | |
| Foreign Key | NO | Parent Entity | |

Definition
Second CCA Number to try (this is 0 for a repeat caller, this is also 0 when the first CCA number is 0)
  outbound_number 2

| Attribute Name | outbound_number2 | Entity Name | IVR_Table |
|---|---|---|---|
| Primary Key | NO | | |
| Foreign Key | NO | Parent Entity | |

Definition
Third CCA Number to try (this is 0 for a repeat caller, this is 0 when the default routing model is the only model accessed, this is 0 when the first CCA number is 0)
  final_called_number

| Attribute Name | final_called_number | Entity Name | IVR_Table |
|---|---|---|---|
| Primary Key | NO | | |
| Foreign Key | NO | Parent Entity | |

Definition
the CCA number which was successfully connected too is stored here
  web_upload

| Attribute Name | web_upload | Entity Name | IVR_Table |
|---|---|---|---|
| Primary Key | NO | | |
| Foreign Key | NO | Parent Entity | |

Definition
web side doesn't need to worry about this column (note from the web side: this is an internal indicator field for the ivr replication mechanism to determine if the system of origin has a replicated the data to the web reporting database)
  hold_datetime

| Attribute Name | hold_datetime | Entity Name | IVR_Table |
|---|---|---|---|
| Primary Key | NO | | |
| Foreign Key | NO | Parent Entity | |

Definition
Date and Time of when caller was put on HOLD, blank if call was terminated before caller was put on hold.
  connect_datetime

| Attribute Name | connect_datetime | Entity Name | IVR_Table |
|---|---|---|---|
| Primary Key | NO | | |
| Foreign Key | NO | Parent Entity | |

Definition
Date and Time of when caller was connected to CCA, blank if call was terminated before caller was connected.
  Member Entity Name Member Primary Keys MemberId Definition The Member table will hold all information specific to a user that requires access to the Members area of the site.

Notes

| Attribute/Role Name | Domain | Datatype | Null | Definition |
|---|---|---|---|---|
| MemberId/ | | INTEGER | ID | A auto-generated id to be used as the primary key of the table. |
| CCAId/CCAId | | INTEGER | Y | |
| UserId/UserId | | INTEGER | Y | Auto-generated id to be used as the primary key of the table. |
| BankId/BankId | | INTEGER | Y | |
| MemberFirstNameTx/ | | VARCHAR(50) | Y | The first name of the user. |
| MemberLastNameTx/ | | VARCHAR(50) | Y | The last name of the user |
| MemberPhoneTx/ | | VARCHAR(12) | Y | The phone number of the user |
| MemberFaxPhoneTx/ | | VARCHAR(50) | Y | The fax number of the user |
| MemberEmailAddrssTx/ | | VARCHAR(50) | Y | The email address of the user |
| MemberInuseIn/ | | BIT | N | Indicates if the member is currently "active" in the site. This is field is used to turn off access to a user without actually deleting there record from the database. 0 = turned off, 1 = turned on. |
| MemberTitleTx/ | | VARCHAR(25) | Y | The title, if any, of the user. I.E. Vice President, or VP accounting dpt. |
| MemberCreateDt/ | | DATETIME | Y | Date the record was created. |
| MemberModifyDt/ | | DATETIME | Y | Date record was last modified. This is set via an update table trigger. |
| MemberChangeTx/ | | VARCHAR(75) | Y | User Id that last created or updated the record. This could be set as either an application specific userid during an SQI update statement or a SQL Server login id via an update table trigger as the default. |

MemberId

| Attribute Name | MemberId | Entity Name | Member |
|---|---|---|---|
| Primary Key | YES | | |
| Foreign Key | NO | Parent Entity | |

Definition

A auto-generated id to be used as the primary key of the table.

CCAId

| Attribute Name | CCAId | Entity Name | Member |
|---|---|---|---|
| Primary Key | NO | | |
| Foreign Key | YES | Parent Entity | CCA |

Definition

UserId

| Attribute Name | UserId | Entity Name | Member |
|---|---|---|---|
| Primary Key | NO | | |
| Foreign Key | YES | Parent Entity | users |

Attributes

Definition

Auto-generated id to be used as the primary key of the table.

BankId

| Attribute Name | BankId | Entity Name | Member |
|---|---|---|---|
| Primary Key | NO | | |
| Foreign Key | YES | Parent Entity | Bank |

Definition

MemberFirstNameTx

| Attribute Name | MemberFirstNameTx | Entity Name | Member |
|---|---|---|---|
| Primary Key | NO | | |
| Foreign Key | NO | Parent Entity | |

Definition

The first name of the user.

MemberLastNameTx

| Attribute Name | MemberLastNameTx | Entity Name | Member |
|---|---|---|---|
| Primary Key | NO | | |
| Foreign Key | NO | Parent Entity | |

Definition
The last name of the user
MemberPhoneTx

| Attribute Name | MemberPhoneTx | Entity Name | Member |
|---|---|---|---|
| Primary Key NO | | | |
| Foreign Key NO | Parent Entity | | |

Definition
The phone number of the user
MemberFaxPhoneTx

| Attribute Name | MemberFaxPhoneTx | Entity Name | Member |
|---|---|---|---|
| Primary Key NO | | | |
| Foreign Key NO | Parent Entity | | |

Definition
The fax number of the user
MemberEmailAddrssTx

| Attribute Name | MemberEmailAddrssTx | Entity Name | Member |
|---|---|---|---|
| Primary Key NO | | | |
| Foreign Key NO | Parent Entity | | |

Definition
The email address of the user
MemberInuseIn

| Attribute Name | MemberInuseIn | Entity Name | Member |
|---|---|---|---|
| Primary Key NO | | | |
| Foreign Key NO | Parent Entity | | |

Definition
Indicates if the member is currently "active" in the site. This is field is used to turn off access to a user without actually deleting there record from the database. 0=turned off, 1=turned on.
MemberTitleTx

| Attribute Name | MemberTitleTx | Entity Name | Member |
|---|---|---|---|
| Primary Key NO | | | |
| Foreign Key NO | Parent Entity | | |

Definition
The title, if any, of the user. I.E. Vice President, or VP accounting dpt.
MemberCreateDt

| Attribute Name | MemberCreateDt | Entity Name | Member |
|---|---|---|---|
| Primary Key NO | | | |
| Foreign Key NO | Parent Entity | | |

Definition
Date the record was created.
MemberModifyDt

| Attribute Name | MemberModifyDt | Entity Name | Member |
|---|---|---|---|
| Primary Key NO | | | |
| Foreign Key NO | Parent Entity | | |

Definition
Date record was last modified. This is set via an update table trigger.
MemberChangeTx

| Attribute Name | MemberChangeTx | Entity Name | Member |
|---|---|---|---|
| Primary Key NO | | | |
| Foreign Key NO | Parent Entity | | |

Definition
User Id that last created or updated the record. This could be set as either an application specific userid during an SQl update statement or a SQL Server login id via an update table trigger as the default:
role
Entity Name role
Primary Keys RoleID
Definition The role table contains the distinct types of access defined in the site. I.E. Bank's, CCA's, SuperAdmin, SiteAdmin etc.
Notes
Attributes

| Attribute/Role Name | Domain | Datatype | Null | Definition |
|---|---|---|---|---|
| RoleID/ | | INTEGER | ID | Auto-generated number used as the primary key of the table. |
| RoleNameTX/ | | VARCHAR(150) | Y | Name for the access type (role). I.E. Bank, CCA, Admin |
| RoleDescTX/ | | LONG VARCHAR | Y | A description of the purpose and/or access level the role confers to the user. |
| RoleCreateDT/ | | DATETIME | Y | Date the role was created |
| RoleModifyDT/ | | DATETIME | Y | Date the role was updated. |
| RoleChangeTX/ | | VARCHAR(75) | Y | User login id (or sql login) of the account used to create or last update the role. |

RoleID

| Attribute Name | RoleID | Entity Name | role |
|---|---|---|---|
| Primary Key YES | | | |
| Foreign Key NO | Parent Entity | | |

Definition
Auto-generated number used as the primary key of the table.
RoleNameTX

| Attribute Name | RoleNameTX | Entity Name | role |
|---|---|---|---|
| Primary Key NO | | | |
| Foreign Key NO | Parent Entity | | |

Definition
Name for the access type (role). I.E. Bank, CCA, Admin
RoleDescTX

| Attribute Name | RoleDescTX | Entity Name | role |
|---|---|---|---|
| Primary Key NO | | | |
| Foreign Key NO | Parent Entity | | |

Definition
A description of the purpose and/or access level the role confers to the user.
RoleCreateDT

| Attribute Name | RoleCreateDT | Entity Name | role |
|---|---|---|---|
| Primary Key NO | | | |
| Foreign Key NO | Parent Entity | | |

Definition
Date the role was created
RoleModifyDT

| Attribute Name | RoleModifyDT | Entity Name | role |
|---|---|---|---|
| Primary Key NO | | | |
| Foreign Key NO | Parent Entity | | |

Definition
Date the role was updated.
RoleChangeTX

| Attribute Name | RoleChangeTX | Entity Name | role |
|---|---|---|---|
| Primary Key NO | | | |
| Foreign Key NO | Parent Entity | | |

Definition
User login id (or sql login) of the account used to create or last update the role.

State
Entity Name State
Primary Keys StateCd
Definition The State table contains the full state name associated with the standard 2 digit state code abbreviation.
Notes
Attributes

| Attribute/Role Name | Domain | Datatype | Null | Definition |
|---|---|---|---|---|
| StateCd/ | | VARCHAR(2) | N | The 2 digit state abbreviation. |
| StateNameTX/ | | VARCHAR(50) | N | The full name of the state. |

StateCd

| Attribute Name | StateCd | Entity Name | State |
|---|---|---|---|
| Primary Key YES | | | |
| Foreign Key NO | Parent Entity | | |

Definition
The 2 digit state abbreviation.
StateNameTX

| Attribute Name | StateNameTX | Entity Name | State |
|---|---|---|---|
| Primary Key NO | | | |
| Foreign Key NO | Parent Entity | | |

Definition
The full name of the state.
TestANI
Entity Name TestANI
Primary Keys TestANITx
Definition This table contains a list of Test ANI's. The entries in this table are to be excluded from the standard web summary reports.
Notes
Attributes

| Attribute/Role Name | Domain | Datatype | Null | Definition |
|---|---|---|---|---|
| TestANITx/ | | VARCHAR(12) | N | An ANI (Phone#). |

TestANITx

| Attribute Name | TestANITx | Entity Name | TestANI |
|---|---|---|---|
| Primary Key YES | | | |
| Foreign Key NO | Parent Entity | | |

Definition
An ANI (Phone#).
Tmplt
Entity Name Tmplt
Primary Keys TmpltId
Definition The Tmplt table contains the names of all dynamic Coldfusion templates on the site.

Notes

Attributes

| Attribute/Role Name | Domain | Datatype | Null | Definition |
|---|---|---|---|---|
| TmpltId/ | | INTEGER | ID | Auto-generated number used as the primary key of the table. |
| TmpltNameTx/ | | VARCHAR(50) | N | the actual coldfusion template name. I.E. Index.cfm |
| TmpltDescTx/ | | LONG VARCHAR | Y | A description of the template. Used to help administrator recognize which template is which. |
| TmpltInuseIn/ | | BIT | N | Indicates if the template is "in use". |

TmpltId

| Attribute Name | TmpltId | Entity Name | Tmplt |
|---|---|---|---|
| Primary Key YES | | | |
| Foreign Key NO | Parent Entity | | |

Definition
Auto-generated number used as the primary key of the table.

TmpltNameTx

| Attribute Name | TmpltNameTx | Entity Name | Tmplt |
|---|---|---|---|
| Primary Key NO | | | |
| Foreign Key NO | Parent Entity | | |

Definition
the actual coldfusion template name. I.E. Index.cfm

TmpltDescTx

| Attribute Name | TmpltDescTx | Entity Name | Tmplt |
|---|---|---|---|
| Primary Key NO | | | |
| Foreign Key NO | Parent Entity | | |

Definition
A description of the template. Used to help administrator recognize which template is which.

TmpltInuseIn

| Attribute Name | TmpltInuseIn | Entity Name | Tmplt |
|---|---|---|---|
| Primary Key NO | | | |
| Foreign Key NO | Parent Entity | | |

Definition
Indicates if the template is "in use".

TmpltText

Entity Name TmpltText

Primary Keys TmpltTextId

Definition The TmpltText table contains all the "changeable" text parts of a Coldfusion template. There may be many text parts for a single template.

Notes

Attributes

| Attribute/Role Name | Domain | Datatype | Null | Definition |
|---|---|---|---|---|
| TmpltTextId/ | | INTEGER | ID | auto-generated number used as the primary key of the table. |
| TmpltId/TmpltId | | INTEGER | N | foreign key to the Tmplt table. Identifies the template the text is to be displayed on. |
| TmpltTextCd/ | | VARCHAR(20) | N | A code which identifies the individual text parts. This code will be used inside the coldfusion template to place text on the page. |
| TmpltTextDescTx/ | | VARCHAR(500) | Y | A description of the text piece to aid administrator in identifying where the text is to be displayed. I.E. "The text blurb at the bottom of the page" |

TmpltTextId

| Attribute Name | TmpltTextId | Entity Name | TmpltText |
|---|---|---|---|
| Primary Key YES | | | |
| Foreign Key NO | Parent Entity | | |

Definition
auto-generated number used as the primary key of the table.
TmpltId

| Attribute Name | TmpltId | Entity Name | TmpltText |
|---|---|---|---|
| Primary Key NO | | | |
| Foreign Key YES | Parent Entity | Tmplt | |

Definition
foreign key to the Tmplt table. Identifies the template the text is to be displayed on.
TmpltTextCd

| Attribute Name | TmpltTextCd | Entity Name | TmpltText |
|---|---|---|---|
| Primary Key NO | | | |
| Foreign Key NO | Parent Entity | | |

Definition
A code which identifies the individual text parts. This code will be used inside the coldfusion template to place text on the page.
TmpltTextDescTx

| Attribute Name | TmpltTextDescTx | Entity Name | TmpltText |
|---|---|---|---|
| Primary Key NO | | | |
| Foreign Key NO | Parent Entity | | |

Definition
A description of the text piece to aid administrator in identifying where the text is to be displayed. I.E. "The text blurb at the bottom of the page"
userrole
Entity Name userrole
Primary Keys UserRoleID
Definition The UserRole table is a cross reference between the Users and Role tables. It is where which roles a particular user has be given is assigned.
Notes
 Attributes

| Attribute/Role Name | Domain | Datatype | Null | Definition |
|---|---|---|---|---|
| UserRoleID/ | | INTEGER | ID | Auto-generated number used as the primary key of the table. |
| UserId/UserId | | INTEGER | N | |
| RoleID/RoleID | | INTEGER | N | |

UserRoleID

| Attribute Name | UserRoleID | Entity Name | userrole |
|---|---|---|---|
| Primary Key YES | | | |
| Foreign Key NO | Parent Entity | | |

Definition
Auto-generated number used as the primary key of the table.
UserId

| Attribute Name | UserId | Entity Name | userrole |
|---|---|---|---|
| Primary Key NO | | | |
| Foreign Key YES | Parent Entity | users | |

Definition
RoleID

| Attribute Name | RoleID | Entity Name | userrole |
|---|---|---|---|
| Primary Key NO | | | |
| Foreign Key YES | Parent Entity | role | |

Definition
users
Entity Name users
Primary Keys UserId
Definition The Users table contains the user login information for a member.
Notes
 Attributes

| Attribute/Role Name | Domain | Datatype | Null | Definition |
|---|---|---|---|---|
| UserId/ | | INTEGER | ID | Auto-generated id to be used as the primary key of the table. |
| UserNameTX/ | | VARCHAR(75) | Y | The account login id that is unique to the site. I.E. member Eddie George might create login id EGeorge. |
| UserPsswdTX/ | | VARCHAR(16) | Y | User specified password for the account. |
| UserInuseIN/ | | BIT | N | Indicates if the user account in "in use". This field is used to turn off user accounts without actually deleting the record from the database. |
| UserCreateDT/ | | DATETIME | Y | Date the account was created. |
| UserModifyDT/ | | DATETIME | Y | Date the account was updated. |
| UserChangeTX/ | | VARCHAR(75) | Y | The login id (or sql login) of the person who created or last updated the record. |

UserId

| Attribute Name | UserId | Entity Name | users |
|---|---|---|---|
| Primary Key YES | | | |
| Foreign Key NO | Parent Entity | | |

Definition
Auto-generated id to be used as the primary key of the table.
UserNameTX

| Attribute Name | UserNameTX | Entity Name | users |
|---|---|---|---|
| Primary Key NO | | | |
| Foreign Key NO | Parent Entity | | |

Definition
The account login id that is unique to the site. I.E. member Eddie George might create login id EGeorge.
UserPsswdTX

| Attribute Name | UserPsswdTX | Entity Name | users |
|---|---|---|---|
| Primary Key NO | | | |
| Foreign Key NO | Parent Entity | | |

Definition
User specified password for the account.
UserInuseIN

| Attribute Name | UserInuseIN | Entity Name | users |
|---|---|---|---|
| Primary Key NO | | | |
| Foreign Key NO | Parent Entity | | |

Definition
Indicates if the user account is "in use". This field is used to turn off user accounts without actually deleting the record from the database.
UserCreateDT

| Attribute Name | UserCreateDT | Entity Name | users |
|---|---|---|---|
| Primary Key NO | | | |
| Foreign Key NO | Parent Entity | | |

Definition
Date the account was created.
UserModifyDT

| Attribute Name | UserModifyDT | Entity Name | users |
|---|---|---|---|
| Primary Key NO | | | |
| Foreign Key NO | Parent Entity | | |

Definition
Date the account was updated.
UserChangeTX

| Attribute Name | UserChangeTX | Entity Name | users |
|---|---|---|---|
| Primary Key NO | | | |
| Foreign Key NO | Parent Entity | | |

Definition
The login id (or sql login) of the person who created or last updated the record.

While the above description contains many specificity's, these should not be construed as limitations on the scope of the invention, but rather as an exemplification of one preferred embodiment thereof. Many other variations are possible such as, but not limited to, those described in the Objects and Advantages section above. Thus, the scope of the invention should be determined by the appended claims and their legal equivalents, rather than by the principal embodiment and other examples described above.

We claim:

1. An apparatus comprising:
a database management system structured to:
cooperate with an interactive voice response system so as to play a message over a peripheral component interconnect,
access a memory that stores a plurality of phone numbers, and
implement outbound phone call dialing operations, including operations that:
retrieve, from the memory, a phone number that is among a part of the plurality of phone numbers,
dial the phone number over an outbound line to attempt to place a call, and
determine whether the call to the phone number was answered, and
if the call was answered, then enable audio communication over the outbound line, time the call, monitor for a hang-up, and when a hang-up is detected, then hang-up at the outbound line, and
if the call was not answered or after said hang-up is detected, then determine whether there is another phone number in the part of the phone numbers to dial and repeat said retrieve operation and said dial operation until there is not another phone number in the plurality of phone numbers to dial; wherein:
the memory contains call referral data for each of a plurality of services and the plurality of phone numbers includes a phone number for each of the services, and
the interactive voice response system is structured to receive, over the peripheral component interconnect, an inbound communication from a caller, and receive a number associated with the inbound communication, the number indicative of a location of the caller, and
the database management system is structured to apply the number indicative of the caller location in a query of the memory to initiate the outbound phone call dialing operations.

2. An apparatus comprising:
an interactive voice response system, the interactive voice response system comprising a peripheral component interconnect, and a database management system, the database management system adapted to cooperate with the interactive voice response system, access a memory that stores a plurality of phone numbers, and implement outbound phone call dialing operations, including operations that:
retrieve, from the memory, a phone number that is among a part of the plurality of phone numbers,
dial the phone number over the peripheral component interconnect to an outbound line to attempt to place a call, and
determine whether the call to the phone number was answered, and if the call was answered, then enable audio communication comprising a prerecorded message over the peripheral component interconnect and the outbound line, time the call, monitor for a hang-up, and when a hang-up is detected, then hang-up at the outbound line, and if the call was not answered or after said hang-up is detected, then determine whether there is another phone number in the part of the phone numbers to dial and repeat said retrieve operation and said dial operation until there is not another phone number in the plurality of phone numbers to dial.

3. The apparatus of claim 2, wherein the outbound phone call dialing operations include, if the call was answered, time the call, and if the hang-up is not detected before the call reaches a predetermined maximum time allowed, then implement the hang-up the call at the outbound line.

4. The apparatus of claim 2, wherein:
the memory contains call referral data for each of a plurality of services and an outbound phone number among the plurality of phone numbers for each of the services, and
the interactive voice response system is adapted to receive, from the peripheral component interconnect, an inbound communication that includes a number indicative of a caller location, and apply the number indicative of the caller location in a query of the memory to initiate the outbound phone call dialing operations.

5. The apparatus of claim 2, wherein the interactive voice response system is adapted to convey, via the audio communication, a warning that the call may be monitored.

6. The apparatus of claim 2, wherein the operations further include operations that track those of the calls that are answered and communicate tracked results via a web server to a third party.

7. A method of using an interactive voice response system, the method comprising:
receiving an inbound communication from a caller, the inbound communication received over a peripheral component interconnect at the interactive voice response apparatus;
at the interactive voice response apparatus, receiving over the peripheral component interconnect a number associated with the inbound communication, the number indicative of a location of the caller;
playing, as at least one interactive voice response over the peripheral component interconnect by the interactive voice response apparatus, a recorded message to the caller;
querying a memory containing call referral data for each of a plurality of services, using the number, to obtain a phone number for a service associated with the location of the caller, the querying carried out by the interactive voice response apparatus; and
providing, by the interactive voice response apparatus, a referral over the peripheral component interconnect which allows the caller to communicate with the phone number for the service associated with the location of the caller.

8. The method of claim 7, further including, storing a phone number of at least one credit counseling agency that is used in the referral.

9. The method of claim 7, further including querying the memory by using the number to select at least three phone numbers for credit counseling services associated with the location of the caller and outputting, in providing the referral, a sequence of the phone numbers automatically selected for the credit counseling services associated with the location of the caller.

10. A method including:
for each of a plurality of phone calls, receiving an inbound phone call from a caller, the inbound phone call received over a peripheral component interconnect at an apparatus;
providing, by the apparatus, interactive voice responsiveness that includes playing a recorded message to the caller; receiving, at the apparatus, a number associated with the phone call, the number indicative of a caller location;
applying, by the apparatus, the number indicative of the caller location in a query to a memory to obtain data indicative of a service location for at least one of a plurality of services; and
responsive at least in part to the number indicative of the caller location and the data indicative of the service location, routing by the apparatus, the inbound phone call to the one of the plurality of services.

11. The method of claim 10, wherein the applying of the number indicative of the caller location in the query to the memory obtains, as the data indicative of the service location, a phone number of a financial assistance provider; and further including: automatically generating call data for each said phone call that is routed to the service and combining the generated call data with the number indicative of the caller location to produce a digital report for the service; and electronically communicating the digital report to the service.

12. The method of claim 10, wherein the receiving of the number indicative of a caller location includes receiving, and then detecting, an automatic number identifier (ANI) or a dialed number information service (DNIS) number.

13. A call referral system comprising:
an apparatus, comprising a programmed computer system, which performs the operations of:
for each of a plurality of phone calls, receiving an inbound phone call from a caller, the inbound phone call received over a peripheral component interconnect at the apparatus;
providing, by the apparatus, interactive voice responsiveness that includes playing a recorded message to the caller over the peripheral component interconnect;
receiving, at the apparatus, a number associated with the phone call, the number indicative of a caller location;
applying, by the apparatus, the number indicative of the caller location in a query to a memory to obtain data indicative of a service location for at least one of a plurality of services;
responsive at least in part to the number indicative of the caller location and the data indicative of the service location, routing by the apparatus, the inbound phone call to the one of the plurality of services;
generating call referral information; and
associating the received number and the generated call referral information so as to generate a digital reporting that is communicated to the one of the plurality of services service.

14. The method of claim 13, wherein the user information comprises a user-entered number.

15. The method of claim 13, wherein said one of the plurality of services is a financial assistance provider.

16. The method of claim 13, wherein said one of the plurality of services is a credit counseling agency.

17. The method of claim 13, wherein said one of the plurality of services is a home equity lender.

18. The method of claim 13, wherein said one of the plurality of services is a debt consolidator.

19. The method of claim 13, wherein said one of the plurality of services is a loan refinancer.

20. The method of claim 13, wherein said one of the plurality of services is a commercial lender.

* * * * *